(12) United States Patent
Thotton Veettil

(10) Patent No.: US 12,041,573 B2
(45) Date of Patent: Jul. 16, 2024

(54) METHODS AND APPARATUS FOR USER DEVICE SELECTION BETWEEN A PLURALITY OF SERVICE PROVIDER NETWORKS

(71) Applicant: Charter Communications Operating, LLC, St. Louis, MO (US)

(72) Inventor: Vinayak K. Thotton Veettil, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/382,902

(22) Filed: Jul. 22, 2021

(65) Prior Publication Data
US 2023/0021596 A1  Jan. 26, 2023

(51) Int. Cl.
*H04W 64/00* (2009.01)
*H04W 8/18* (2009.01)
*H04W 8/22* (2009.01)
*H04W 88/06* (2009.01)

(52) U.S. Cl.
CPC ............ *H04W 64/00* (2013.01); *H04W 8/18* (2013.01); *H04W 8/22* (2013.01); *H04W 88/06* (2013.01)

(58) Field of Classification Search
CPC ......... H04W 64/00; H04W 8/18; H04W 8/22; H04W 88/06
See application file for complete search history.

(56) References Cited

U.S. PATENT DOCUMENTS

| 8,041,385 B2 | 10/2011 | Shi et al. | |
|---|---|---|---|
| 9,594,538 B2 | 3/2017 | Jouin | |
| 2012/0309344 A1* | 12/2012 | Ferrazzini | H04M 15/77 455/406 |
| 2015/0057044 A1* | 2/2015 | Altman | H04W 12/08 455/558 |

(Continued)

OTHER PUBLICATIONS

Texas Instruments, Wireless connectivity Technology Selection Guide, 2019, 5 pages.

(Continued)

*Primary Examiner* — Barry W Taylor
(74) *Attorney, Agent, or Firm* — Straub & Straub; Michael P. Straub; Stephen T. Straub

(57) ABSTRACT

A control device receives information, e.g., network status information and network loading information, from a plurality of service provider networks and device capability information and status information, from a plurality of user equipment (UE) devices. UEs subscribe to multiple service provider networks. In some geographical regions, coverage is provided by more than one network. The control device generates and sends device profile to network mapping information to UEs on an individual UE basis, e.g., for geographic regions, e.g., 3D regions, where multiple networks are available. Device profile to network mapping information sometimes includes criteria, e.g. rules, parameter, limits, etc. An application on the UE uses the received device profile to network mapping information, along with position information, to select a network/profile to use at a given time. Altering the information provided to one or more UEs allows the control device to perform load balancing between networks.

15 Claims, 23 Drawing Sheets

(56) References Cited

U.S. PATENT DOCUMENTS

| | | | |
|---|---|---|---|
| 2015/0304506 A1* | 10/2015 | Zhu | H04W 8/205 |
| | | | 455/406 |
| 2016/0156607 A1 | 6/2016 | Kim et al. | |
| 2016/0157085 A1* | 6/2016 | Yeoum | H04L 67/306 |
| | | | 455/435.1 |
| 2020/0008049 A1* | 1/2020 | Namiranian | H04W 12/0433 |
| 2020/0021984 A1* | 1/2020 | Nagao | H04W 48/18 |
| 2020/0037237 A1 | 1/2020 | Becha et al. | |
| 2020/0267532 A1* | 8/2020 | Lee | H04W 88/06 |
| 2021/0185540 A1* | 6/2021 | Gundavelli | H04W 4/60 |
| 2022/0086846 A1 | 3/2022 | Sharma | |
| 2022/0116763 A1 | 4/2022 | Bouskila et al. | |

OTHER PUBLICATIONS

Kyuho Son, Song Chong, Gustavo De Veciana, Dynamic Association for Load Balancing and Interference Avoidance in Multi-Cell Networks, IEEE Transactions on Wireless Communications, Jul. 2009, 11 pages, vol. 8 No. 7.

Sumita Mishra, Nidhi Mathur, Load Balancing Optimization in LTE/LTE-A Cellular Networks: A Review, Electronics and Communication Engineering Department, Amity school of Engineering and Technology, Dec. 2014, 7 pages.

* cited by examiner

METHODS AND APPARATUS FOR USER DEVICE SELECTION BETWEEN A PLURALITY OF SERVICE PROVIDER NETWORKS

FIELD

The present application relates to wireless communications and, more particularly, to methods and apparatus for managing and/or controlling communications networks and/or user device network selection, e.g., in geographical regions where a plurality of alternative networks are available to a user device.

BACKGROUND

Various technologies have been developed to allow a wireless communications device to support the use of different networks. For example, an embedded subscriber Identity Modules (e-SIM) can be used in combination with a physical (p-SIM) in some devices to support different profiles with each profile in some cases corresponding to a communications network to which the device can attach and obtain services.

While a device may be able to attach to different networks, simple selections based on a static fixed network priority list fails to take into consideration a variety of factors such as network loading, reliability and/or cost to mention but a few factors.

In view of the above it should be appreciated that there is a need for improved control of profile and/or network selection by user devices seeking to obtain services from one or more wireless networks.

It would be desirable if methods and/or apparatus could be developed which could be used to influence or control user device selection between a plurality of networks and/or service profiles. It would also be desirable if the selection methods and/or apparatus used by a user device could be updated to reflect changes in network conditions, service quality and/or loading on one or more networks. It would also be desirable is different user devices could be configured differently, e.g., to manage loads between networks in one or more areas, even when the devices have the same capabilities and/or service subscriptions.

SUMMARY

In various embodiments a control device, e.g., server, coupled to various different service provider networks and having access to the status, loading and/or condition of the networks, is used to influence network selection and use taking into consideration the capabilities of individual devices and the multiple service subscriptions at least some devices have which allow them to use a variety of different overlapping networks, e.g., where network coverage of different service providers overlap.

In some embodiments a control device receives information, e.g., network status information and network loading information, from a plurality of service provider networks. The control device also receives device capability information and status information, from a plurality of user equipment (UE) devices. One or more UEs subscribe to multiple service provider networks. In some geographical regions, coverage is provided by more than one network. The control device generates and sends device profile to network mapping information to UEs on an individual UE basis, e.g., for each of one or more geographic regions, e.g., 3D regions, where multiple networks are available.

The generated device profile information maybe pushed to the UE device by the control server, e.g., when a network condition or loading change is detected for example, or requested by an individual UE, e.g., because of a change in UE communications needs or a change in network conditions detected by the UE. In addition, depending on the embodiment individual UEs may poll for updates of the information used for profile/network selection on a schedule or periodic basis depending on the embodiment.

The device profile to network mapping information sometimes includes criteria, e.g., rules, parameter, limits, etc. An application on the UE uses the received device profile to network mapping information along with position information to select a network/profile to use at a given time. The control device can implement load balancing between networks by altering the information provided to one or more UEs.

A communications system includes in at least some embodiments a plurality of different service provider networks. A user equipment device, e.g., including a physical Subscriber Identity Module (p-SIM) and an embedded subscriber Identity Module (e-SIM), includes the capability to access a set of service provider networks. Different UEs may be able to access different sets of networks. Different networks provide access to different geographical regions, e.g., depending upon the location of their access devices, e.g., base stations, access points, gateways, etc., and their operational ranges. In some regions a combination of alternative networks are available to be used by one or more of the UE devices.

A control device, e.g. a control server, collects information from: i) the service provider networks, e.g., including location information, network loading and network status information, and ii) the UE devices, e.g., including device type information, device capability information, device location information, subscription information, latency information, and resource requirements/needs information. The control device, with an overall view of the system, processes the received information and generates UE device profile to network mapping information, e.g. service bubble information, for different geographical regions, on an individual UE basis. The UE device profile to network mapping information is communicated from the control device to the UE, which stores the set of information. The UE device uses the profile to network mapping information to determine, e.g. select, a particular network to use in a particular geographic region. The UE device profile to network mapping information may, and sometimes does, specify a particular network to be used by the UE in a particular geographic region. This information in the UE maybe and sometime is updated by the control server based on network changes, e.g., to achieve load balancing and/or to provide the UE a desired level of quality of service as the capability of some networks to provide service changes over time. In some embodiments, the UE device profile to network mapping information includes selection criteria, e.g., rules, limits, identified parameters to be evaluated, to be used by the UE in making a selection decision among a plurality of alternative available networks.

Thus, in some embodiments, the control device, which has an overall view of the entire system, generates and sends network selection criteria, e.g., including rules to be evaluated, to an individual UE device for a particular geographic region. This information supplied from the control device is typically intended to be used by the UE device for an extended period of time, e.g., in some embodiments, the UE makes many, e.g., several, hundreds or even thousands of network selections in some but not all embodiments, using this supplied criteria, before the information is updated. However, in the case of a network change the control device may promptly update the information, e.g., within minutes of a change in load or a network's ability to provide a desired quality of service level. Thus, while the network selection criteria may be used for a period of time it is far from a static list which does not change in that when a change is desirable the control server can update the selection information in one or more UEs in minutes and/or hours to alter the relative load between networks and/or for other reasons. Furthermore, the network selection rules and/or criteria provide flexibility in some cases with the network and/or profile selection criteria, rules and other information being, in some but not necessarily all embodiments more than a simple network or priority list.

The UE device uses the supplied criteria and current information known to the UE, e.g., its current data backlog, its current latency requirements, its current battery status, its current set of applications running, etc., to make the final determination as to the network to use at the present time. Thus, in some embodiments, the refined network selection process for a UE in a particular geographic region, in which there are alternative networks, benefits from the overall system knowledge of the control device and the individual current UE device status/needs knowledge.

In some embodiments, the network control device performs overall networks' load balancing by performing and/or influencing network selection for individual UEs on a per geographical region basis.

An exemplary method of operating a control device, e.g., a control server, in accordance with some embodiments, comprises: storing network information for a plurality of communications networks said network information including network type, geographic coverage area and supported data rate information; monitoring status of at least some of said communications networks; storing device profile information for at least a first communications device, said first communication device being capable of connecting to a plurality of communications networks, said device profile information including first device profile information including information for a plurality of device profiles which can be used by the first communications device, said first device profile information including at least a first profile corresponding to a first network and a second profile corresponding to a second network; and generating first device geographic region to profile mapping information, said first device geographic region to profile mapping information specifying: i) one or more rules, ii) information and/or iii) rules and information used to map geographic regions to one of the device profiles available to be used by the first communications device.

An exemplary method of operating a first user equipment (UE) device, in accordance with some embodiments, comprises: receiving geographical region to user device profile mapping information for a set of user profiles supported by the first user equipment device, each profile corresponding to a different profile supported by an embedded Subscriber Identity Module (e-SIM) or physical Subscriber Identity Module (p-SIM); determining the geographic location of the first UE device; determining status; and selecting based on the geographical region to user device profile mapping information a first profile to use.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 12 comprises the combination of FIG. 12A, FIG. 12B, FIG. 12C and FIG. 12D.

DETAILED DESCRIPTION

Figure 1:
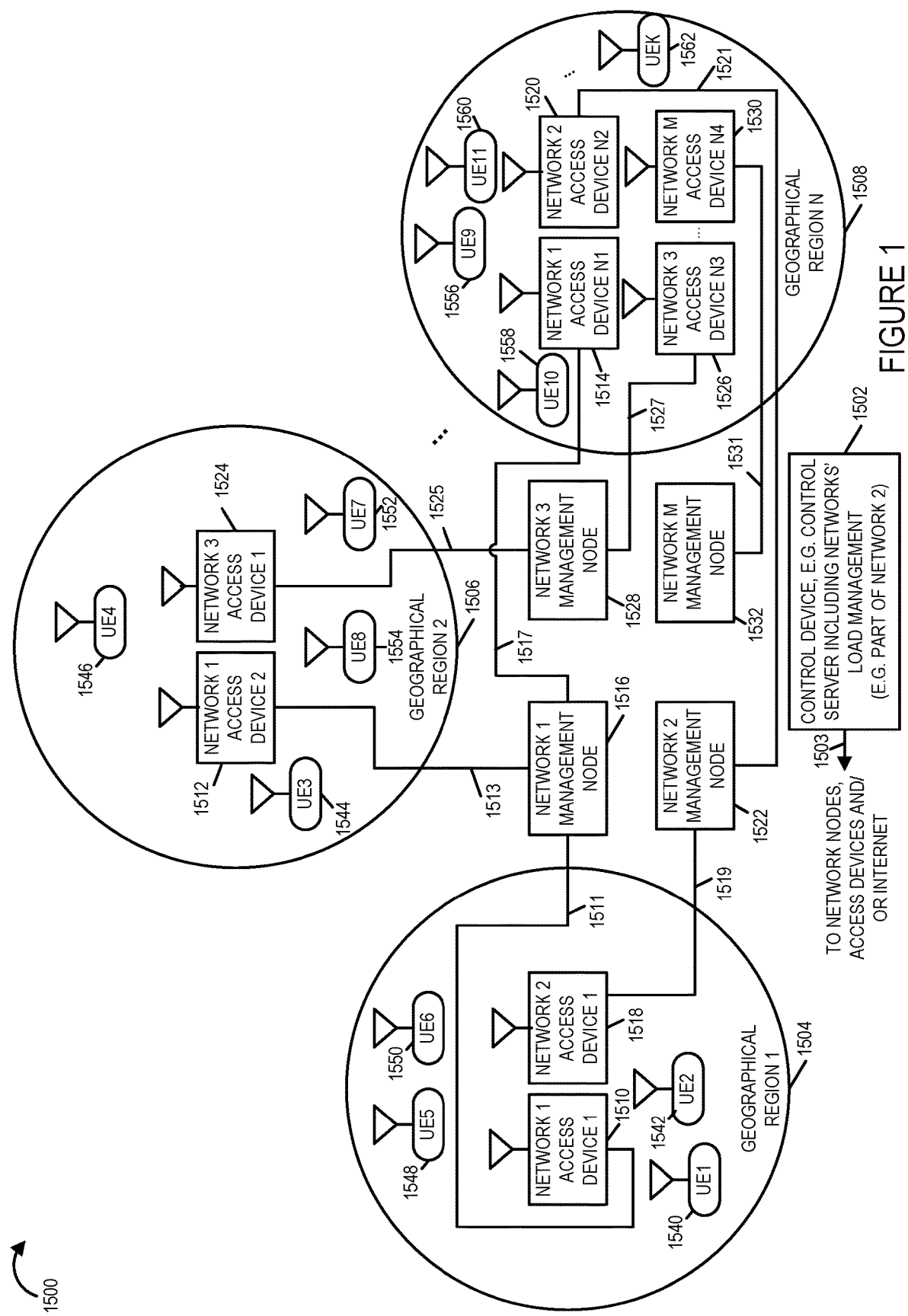
FIG. 1 is a drawing of an exemplary communications system in accordance with an exemplary embodiment.

FIG. 1 is a drawing of an exemplary communications system 1500 in accordance with an exemplary embodiment. Exemplary communications system 1500 includes a control device 1502, e.g. a control server including networks' load management capabilities. Control device 1502 is coupled to network nodes, access nodes and/or the Internet via connection 1503. Exemplary communications system 1500 includes a plurality of networks (network 1, network 2, network 3, . . . , network M) coupled together. Network 1 includes a plurality of network 1 access devices, e.g. network 1 cellular base stations, (network 1 access device 1 1510, network 1 access device 2 1512, . . . , network 1 access device N1 1514) and network 1 management node 1516 coupled together via communications links (1511, 1513, . . . , 1515), respectively. Network 2 includes a plurality of network 2 access devices, e.g. network 2 WiFi access points, (network 2 access device 1 1518, . . . , network 2 access device N2 1520) and network 2 management node 1522 coupled together via communications links (1519, . . . , 1521), respectively. Network 3 includes a plurality of network 3 access devices, e.g. network 3 CBSD base stations, or LoRa base station, or IoT gateways, or BLE base stations, (network 3 access device 1 1524, . . . , network 3 access device N3 1526) and network 3 management node 1528 coupled together via communications links (1525, . . . , 1527), respectively. Network M includes a plurality of network M access devices including network M access device N4 1530 and network M management node 1532 coupled together via communications link 1531.

Exemplary communications system 1500 further includes a plurality of user equipment (UE) devices (UE 1 1540, UE 2 1542, UE 3 1544, UE 4 1546, UE 5 1548, UE 6 1550, UE 7 1552, UE 8 1554, UE 9 1556, UE 10 1558, UE 11 1560, . . . , UE K 1562). At least some of the UEs are mobile devices which may move throughout the communications system 1500. The coverage area of the communications system 1500 includes a plurality of geographic regions (geographical region 1 1504, geographical region 2 1506, . . . , geographical region N 1508). Network 1 access device 1 1510 and network 2 access device 2 provide wireless coverage in geographical region 1 1504. Network 1 access device 2 1512 and network 3 access device 1 provide wireless coverage in geographical region 2 1506. Network 1 access device N1 1514, network 2 access device N2 1520, network 3 access device N3 1526 and network M access device N4) provide wireless coverage in geographical region 3 1508. Different UEs have different capabilities with regard to connectivity to networks. At least some of the UEs are capable of connecting to a plurality of different networks. In some embodiments, at least some of the UEs include i) a physical Subscriber Identity Module (p-SIM) card and ii) an embedded SIM (e-SIM) or integrated SIM (i-SIM).

In some embodiments, the control device 1502 is included as part of one of the networks in system 1500, e.g., as part of network 2. In embodiments, control device 1502 is one of the network management nodes, e.g. control device 1502 is network management node 2 1522. The control device 1502 receives information from the networks and UE devices and determines service bubble information for the UEs, e.g., on an ongoing basis. A set of service bubble information is communicated to each individual UE including information to be used by the UE to determine which network to use, e.g. in a particular geographical region at a particular time under a particular set of observed conditions. In some embodiments, the service bubble information may, and sometimes does, includes information specifying which network is to be used by the UE in a particular geographical region. In some embodiments, the service bubble information may, and sometimes does, include information specifying criteria, e.g., including rules and parameters, to be used by the UE in determining which one of a plurality of alternative networks is to be selected to be used by the UE in a particular geographical region. Service bubble information is updated on an ongoing basis, e.g. in response to detected network changes, e.g. loading changes, fault conditions, etc. and/or UE device status changes, e.g. in battery power, applications running, amount of data to be transmitted, location, latency requirements, QoS required, measured interference levels, measured SNR, detected signal strength levels, user subscriptions to networks and/or services, etc.

Figure 2:
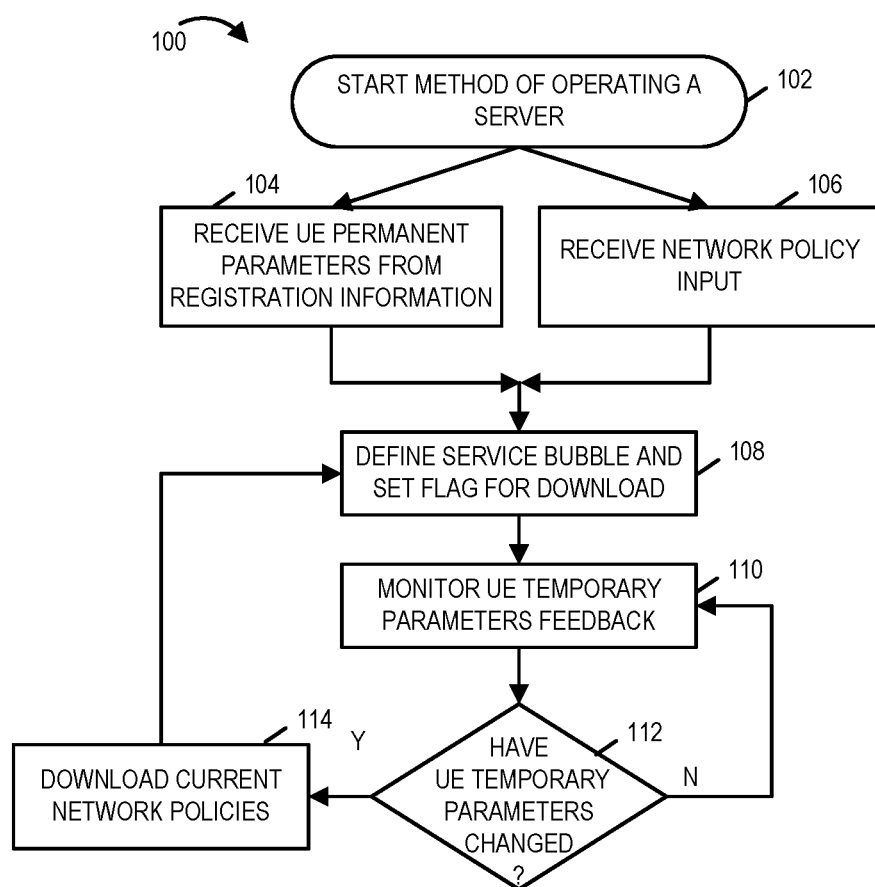
FIG. 2 is a drawing of a flowchart of an exemplary method of operating a server in accordance with an exemplary embodiment.

FIG. 2 is a drawing of a flowchart 100 of an exemplary method of operating a server in accordance with an exemplary embodiment. Operation of the exemplary method starts in step 102, in which the server is powered on an initialized. Operation proceeds from start step 102 to steps 104 and 106. In step 104, the server receives user equipment (UE) permanent parameters, e.g., device ID information, device type information, device capability information, screen size information, battery capacity information, memory capacity information, etc. from registration information. In step 106 the server receives network policy input information. Operation proceeds from steps 104 and 106 to step 108.

In step 108 the server defines, e.g. generates, a service bubble, e.g. based on the received UE permanent parameters, received network policy input information, time information, and default information, and sets a flag for download, e.g. sets a flag to indicate to the UE that the UE may download the newly generated service bubble. Operation proceeds from step 108 to step 110. In step 110 the server monitors for UE temporary parameters feedback. Exemplary UE temporary parameter feedback information includes, e.g., usage type, subscription type, current battery stored energy status information, charging state information, and current UE location information. Operation proceeds from step 110 to step 112. In step 112 the server determines if UE temporary parameters have changed, e.g., from UE default values or from last UE reported values. If the server determines that UE temporary parameters have changed, then operation proceeds from step 112 to step 114; otherwise, operation proceeds from step 112 to step 110 for additional monitoring for UE temporary parameter feedback information from the UE.

In step 114 the server downloads current network policies. Operation proceeds from step 114 to step 108. In step 108 the server defines a new service bubble, using the permanent UE parameters from registration, the update UE temporary parameters based on received UE feedback, and downloaded current network policies, and sets a flag to indicate the newly generated service bubble may be downloaded by the UE.

Figure 3:
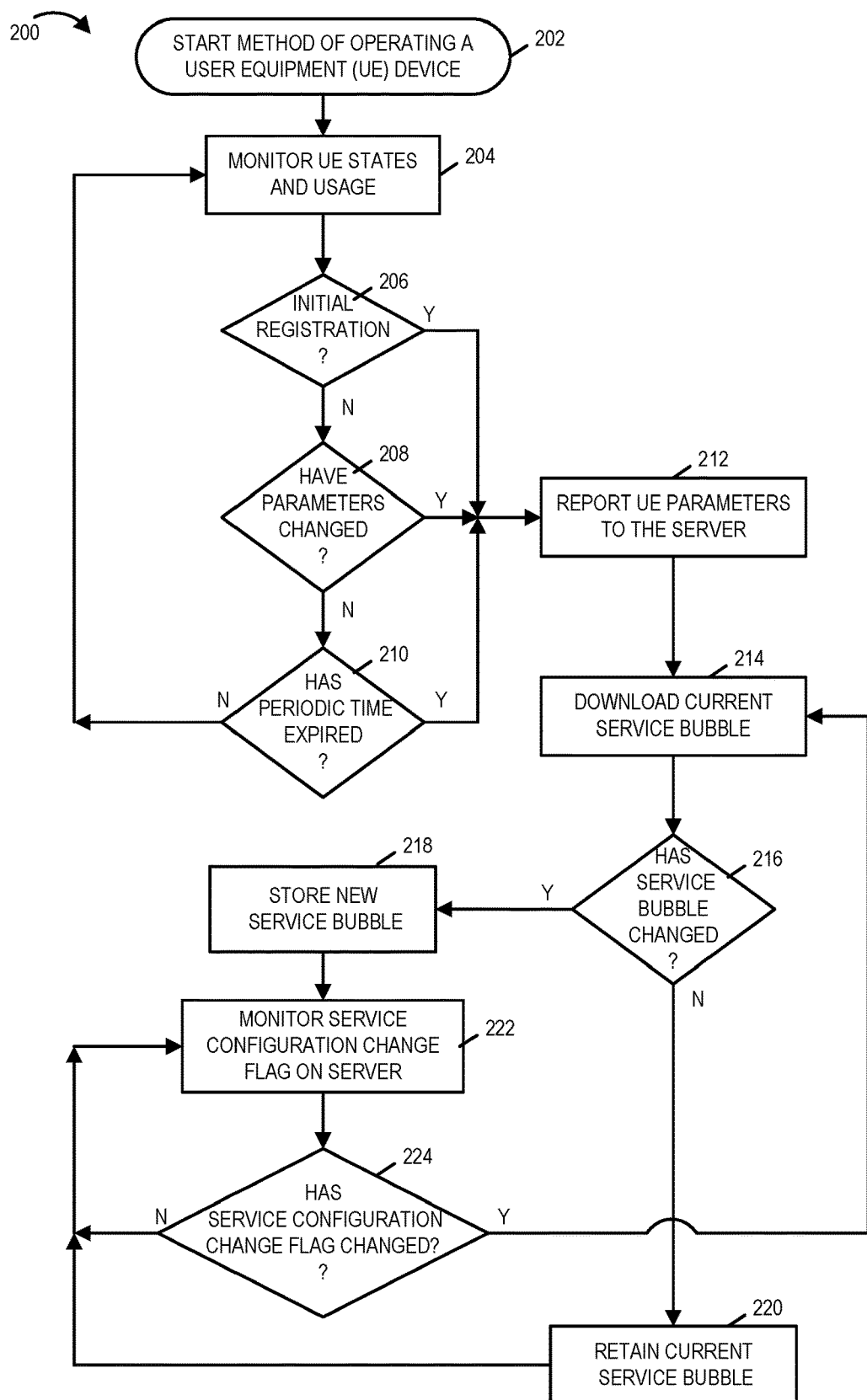
FIG. 3 is a drawing of a flowchart of an exemplary method of operating a user equipment (UE) device in accordance with an exemplary embodiment.

FIG. 3 is a drawing of a flowchart 200 of an exemplary method of operating a user equipment (UE) device in accordance with an exemplary embodiment. Operation starts in step 202 in which the UE is powered on and initialized. In some embodiments, as part of step 202 the UE loads, e.g., from its memory, a default service bubble or a last used service bubble. In some embodiments, in step 202 the UE starts a periodic timer, e.g., a periodic timer which is a countdown timer for a maximum allowable time interval between sending UE parameter updates to the server. Operation proceeds from start step 202 to step 204. In step 204 the UE monitors UE states and usage. Operation proceeds from step 204 to step 206. In step 206 the UE determines if the UE is in initial registration. In various embodiments, as part of an initial registration process, the UE generates an initial set of UE parameters and stores the generated set of UE parameters as the current set of UE parameters. If the UE is in initial registration, then operation proceeds from step 206 to step 212; otherwise, operation proceeds from step 206 to step 208. In step 208 the UE determines if it's set of stored UE parameters has changed. If the determination of step 208 is that the set of stored UE parameters has changed, then operation proceeds from step 208 to step 212; otherwise, operation proceeds from step 208 to step 210. In step 210 the UE determines if the periodic timer has expired. If the determination of step 210 is that the periodic timer has expired, then operation proceeds from step 210 to step 212; otherwise, operation proceeds from step 210 to step 204 for additional monitoring of UE states and usage.

Returning to step 212, in step 212 the UE reports a current set of UE parameters to the server. If operation had proceeded to step 212 from step 206, then the reported set of UE parameters is an initial set of UE parameters obtained from the registration process. If operation had proceeded to step 212 from step 208, then the reported set of UE parameters is an updated set of UE parameters which includes at least one change from the last reported set of UE parameters. If operation had proceeded to step 212 from step 210, the reported set of UE parameters is the same set of UE parameters which has been previously reported but is being sent because the periodic timer has expired, thus providing confirmation that the UE is still active and is stable with regard to its set of UE parameters.

Thus, in step 212 the UE reports current UE parameters to the server. In various embodiments, as part of step 212, the UE restarts the periodic timer. Operation proceeds from step 212 to step 214.

In step 214 the UE downloads the current service bubble, corresponding to the UE, from the server. Operation proceeds from step 214 to step 216. In step 216 the UE determines if the service bubble has changed, e.g., does the service bubble which was just downloaded, match the previously stored service bubble which is currently being used by the UE. If the determination is that the service bubble has not changed, then operation proceeds from step 216 to step 220, in which the UE is operated to retain its current service bubble, e.g., no update is needed. However, if the determination is that the service bubble has changed, then operation proceeds from step 216 to step 218, in which the UE stores the new service bubble, which was downloaded in step 214, in its memory as its current service bubble, e.g., the service bubble in UE memory is updated. Operation proceeds from step 218 or step 220 to step 222.

In step 222 the UE monitors the service configuration change flag on the server. Operation proceeds from step 222 to step 224. In step 224, the UE determines if the service configuration change flag has changed. If the determination of step 224, is that the service configuration change flag has changed then operation proceeds from step 224 to step 214, in which the UE downloads the current service bubble from the server. However, if the determination of step 224 is that the service configuration change flag has not changed, then operation proceeds from step 224 to step 222 for additional monitoring of the flag.

Figure 4:
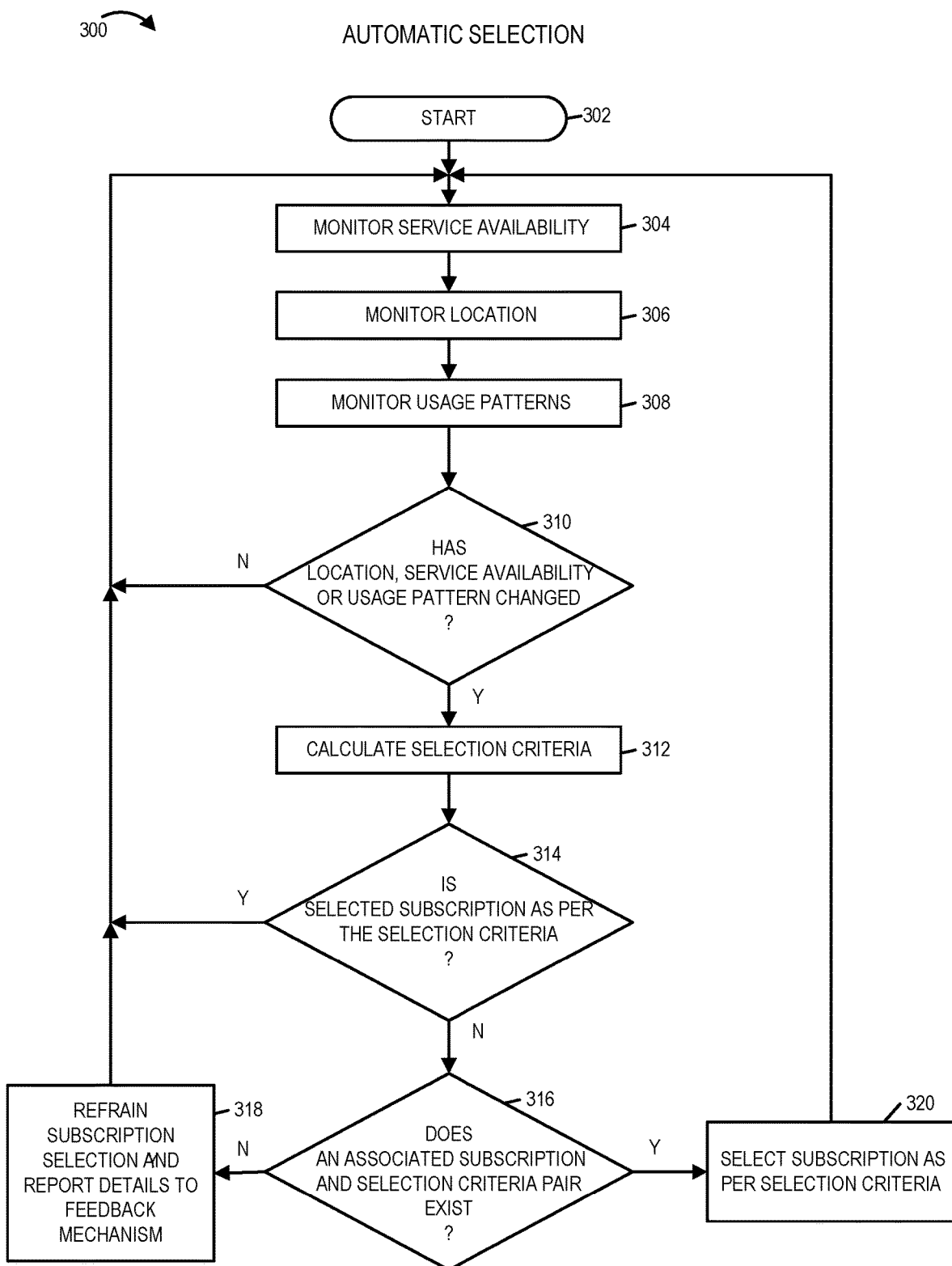
FIG. 4 is drawing of a flowchart of an exemplary automatic selection method in accordance with an exemplary embodiment.

FIG. 4 is drawing of a flowchart 300 of an exemplary automatic selection method, which may be performed by a UE device, in accordance with an exemplary embodiment. The exemplary automatic selection method of flowchart 300 selects between alternative subscriptions, e.g., corresponding to different service providers, without the need for user input or intervention. Operation of the exemplary method starts in step 302, in which the UE is powered on and initialized. Operation proceeds from start step 302 to step 304. In step 304 the UE monitors service availability. Operation proceeds from step 304 to step 306. In step 306 the UE monitors its location. In step 308 the UE monitors its usage pattern. Operation proceeds from step 308 to step 310.

In step 310 the UE determines if one or more of location, service availability or usage pattern has changed. If the determination is that location, availability and usage pattern have not changed, then operation proceeds from step 310 to the input of step 304 for another set of monitoring to be performed. However, if the determination of step 310 is that at least one of service availability, location or usage patterns has changed, then operation proceeds from step 310 to step 312.

In step 312 the UE calculates selection criteria, e.g., based on the most recent location information, most recent service availability information, and most recent usage pattern information. Operation proceeds from step 312 to step 314.

In step 314 the UE determines if the selected subscription as per the selection criteria, e.g., does the calculated selection criteria from step 312 map to the selected subscription which is currently in use. If the determination is that the selected subscription is per the selection criteria, then a change is not needed and operation proceeds from step 314 to the input of step 304 for additional monitoring. However, if the determination is that the selected subscription is not per the selection criteria, e.g., the calculated selection criteria from step 312 does not map to the selected subscription which is currently in use, then a change is needed and operation proceeds from step 314 to the input of step 316.

In step 316 the UE determines if an associated subscription and selection criteria pair exists, e.g., based on the currently stored service bubble for the UE and the calculated selection criteria from step 312. If the determination of step 316 is that an associated subscription and selection criteria pair exists, e.g., in the stored service bubble for the UE, then operation proceeds from step 316 to step 320, in which the UE selects the subscription as per selection criteria, e.g., changes its current subscription to be used to match the calculated selection criteria. Operation proceeds from step 320 to the input of step 304 for additional monitoring. However, if the determination of step 316 is that an associated subscription and selection criteria pair does not exist, e.g. in the stored service bubble for the UE, then operation proceeds from step 316 to step 318, in which the UE is controlled to refrain subscription selection and to report details to the feedback mechanism, e.g., feedback information to the service so that a new service bubble may be generated by the server for the UE to accommodate the current conditions, if possible or deemed appropriate by the server. Operation proceeds from step 318 to the input of step 304.

Figure 5:
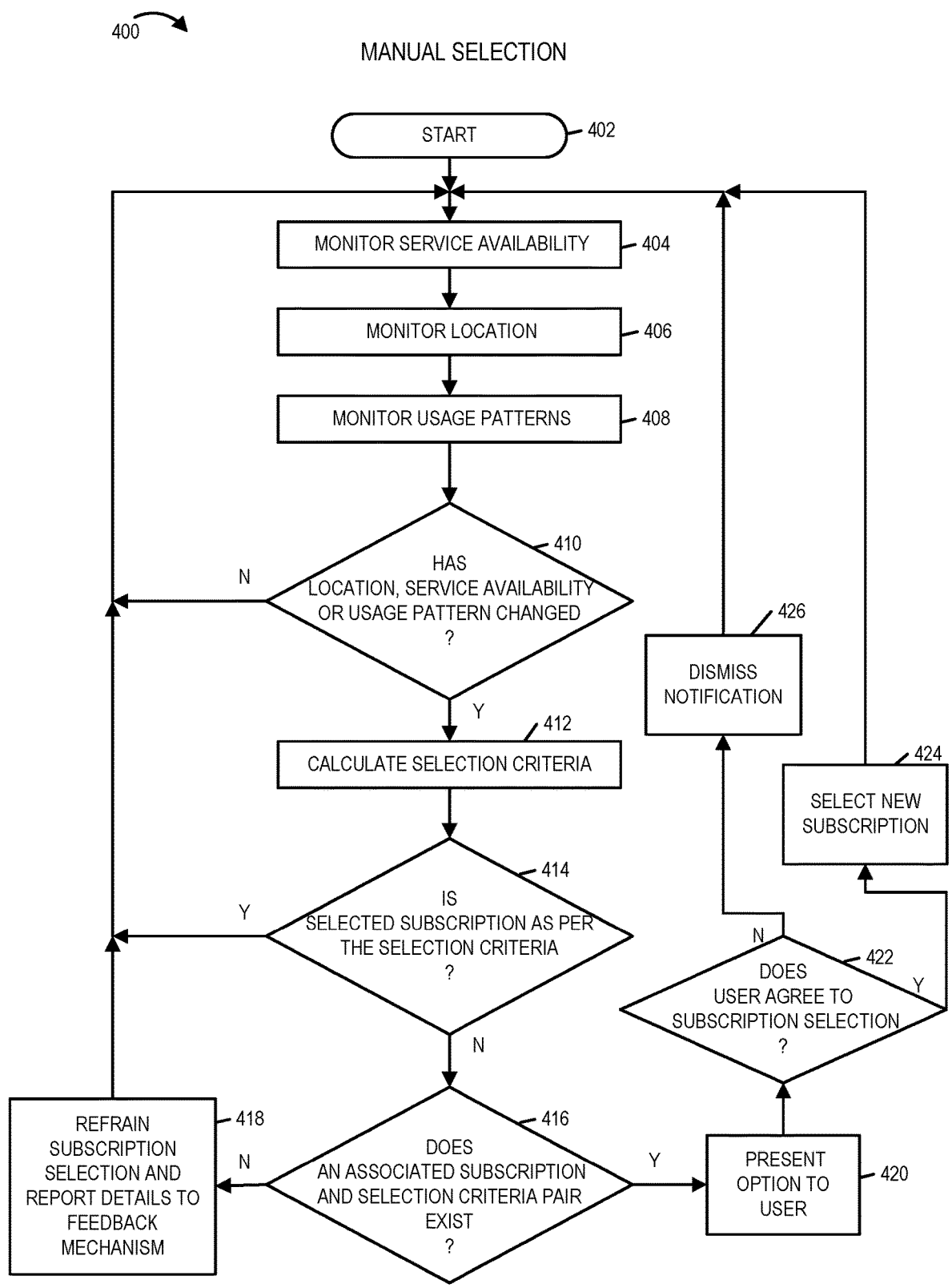
FIG. 5 is a drawing of a flowchart of an exemplary manual selection method in accordance with an exemplary embodiment.

FIG. 5 is a drawing of a flowchart 400 of an exemplary manual selection method, which may be performed by a UE device, in accordance with an exemplary embodiment. The exemplary manual selection method of flowchart 400 selects between alternative subscriptions, e.g., corresponding to different service providers, and processes received user input, e.g., requires user agreement, prior to implementing a subscription change.

Operation of the exemplary method starts in step 402, in which the UE is powered on and initialized. Operation proceeds from start step 402 to step 404. In step 404 the UE monitors service availability. Operation proceeds from step 404 to step 406. In step 406 the UE monitors its location. In step 408 the UE monitors its usage pattern. Operation proceeds from step 408 to step 410.

In step 410 the UE determines if one or more of location, service availability or usage pattern has changed. If the determination is that location, availability and usage pattern have not changed, then operation proceeds from step 410 to the input of step 404 for another set of monitoring to be performed. However, if the determination of step 410 is that at least one of service availability, location or usage patterns has changed, then operation proceeds from step 410 to step 412.

In step 412 the UE calculates selection criteria, e.g., based on the most recent location information, most recent service availability information, and most recent usage pattern information. Operation proceeds from step 412 to step 414.

In step 414 the UE determines if the selected subscription as per the selection criteria, e.g., does the calculated selection criteria from step 412 map to the selected subscription which is currently in use. If the determination is that the selected subscription is per the selection criteria, then a change is not needed and operation proceeds from step 414 to the input of step 404 for additional monitoring. However, if the determination is that the selected subscription is not per the selection criteria, e.g., the calculated selection criteria from step 412 does not map to the selected subscription which is currently in use, then a change is needed and operation proceeds from step 414 to the input of step 416.

In step 416 the UE determines if an associated subscription and selection criteria pair exists, e.g., based on the currently stored service bubble for the UE and the calculated selection criteria from step 412. If the determination of step 416 is that an associated subscription and selection criteria pair exists, e.g., in the stored service bubble for the UE, then operation proceeds from step 416 to step 420, in which the UE device presents an option to the user of the UE device to change the subscription selection, e.g., to the identified associated subscription in the stored service bubble which matches the current selection criteria. Operation proceeds from step 420 to step 422, in which the UE determines if the user agrees to the presented subscription selection. In various embodiments, in step 422 the UE device receives input from the user, in response to the option presentation of step 420, indicating whether or not the user agrees to the subscription selection. If the user agrees to the subscription selection, then operation proceeds from step 422 to step 424, in which the UE selects the new subscription and starts using the selected new subscription for communications. However, if the user does not agree to the subscription selection, then operation proceeds from step 422 to step 426, in which the UE dismisses the notification and continues to uses the current subscription, e.g. no change is implemented. Operation proceeds from step 424 or step 426 to the input of step 404 for additional monitoring.

Returning to step 414, if the determination of step 416 is that an associated subscription and selection criteria pair does not exist, e.g. in the stored service bubble for the UE, then operation proceeds from step 416 to step 418, in which the UE is controlled to refrain subscription selection and to report details to the feedback mechanism, e.g., feedback information to the service so that a new service bubble may be generated by the server for the UE to accommodate the current conditions, if possible or deemed appropriate by the server. Operation proceeds from step 418 to the input of step 404 for additional monitoring.

Figure 6:
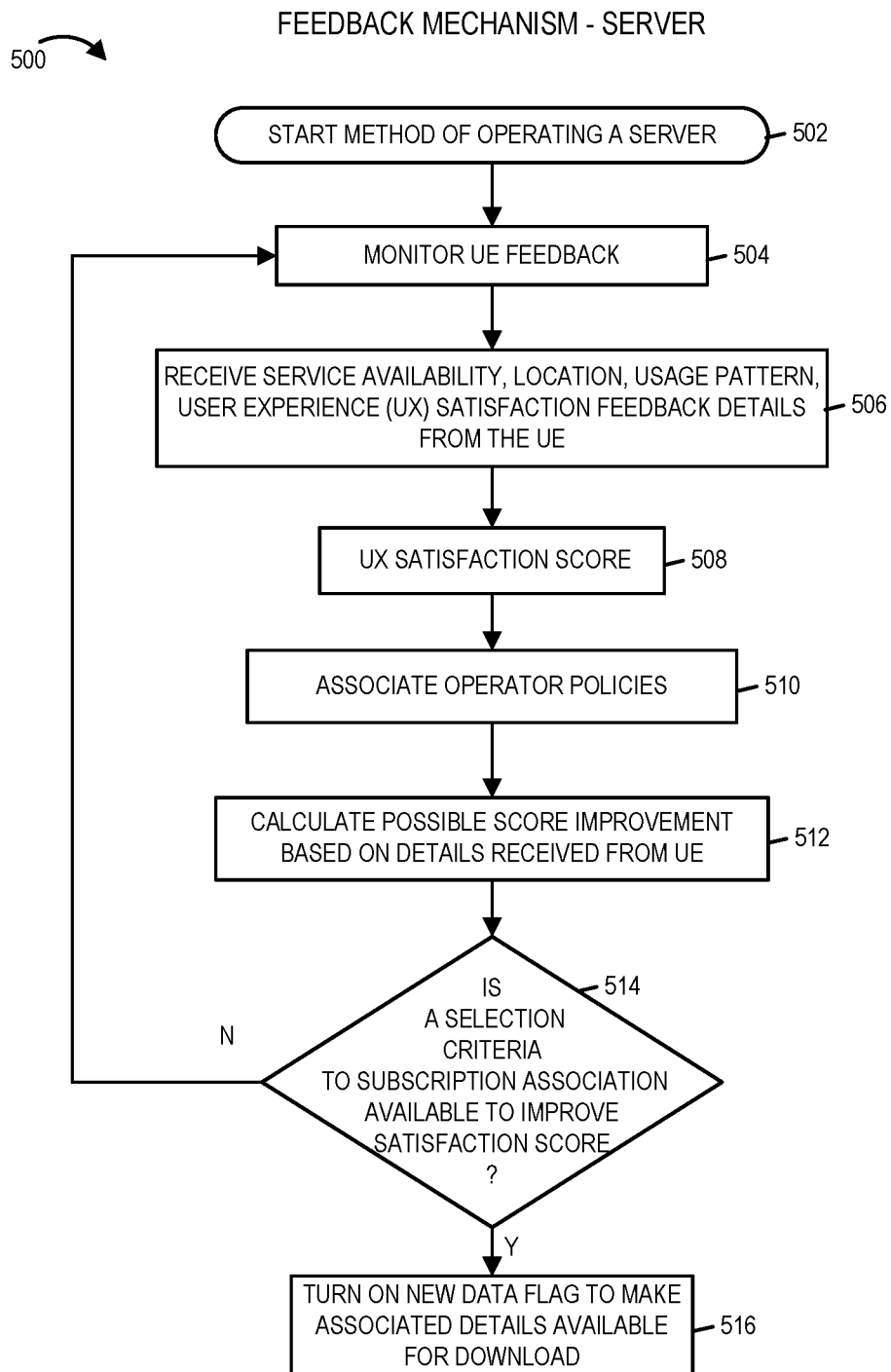
FIG. 6 is a drawing of a flowchart of an exemplary method of operating a server in accordance with an exemplary embodiment, said method including receiving and using UE feedback information.

FIG. 6 is a drawing of a flowchart 500 of an exemplary method of operating a server in accordance with an exemplary embodiment, said method including receiving and using UE feedback information. Operation of the exemplary method starts in step 502 and proceeds to step 504. In step 504 the server monitors for UE feedback. Operation proceeds from step 504 to step 506. In step 506 the server receives service availability, location, usage pattern, and/or user experience (UX) satisfaction feedback details from the UE. Operation proceeds from step 506 to step 508. In step 508 the server generates a user experience (UX) satisfaction score for the UE, e.g., based on received user experience (UX) satisfaction feedback details from the UE from step 506. Operation proceeds from step 508 to step 510. In step 510 the server associates operator policies with the UE. Operation proceeds from step 510 to step 512. In step 512 the server calculates a possible score improvement for the UX satisfaction score for the UE based on details received from the UE, e.g., based on received service availability info, location and usage pattern information. Operation proceeds from step 512 to step 514.

In step 514 the server determines if a selection criteria to subscription association is available to improve the satisfaction score. If the determination is that there is not a selection criteria to subscription association available to improve the satisfaction score, then operation proceeds from step 514 to step 504 for additional monitoring of UE feedback. However, in step 514 if the determination is that there is a selection criteria to subscription association available to improve the satisfaction score, then operation proceeds from step 514 to step 516 in which the server turns on the new data flag to make associated details available for download, by the UE, e.g. the UE can download a new service bubble.

Figure 7:
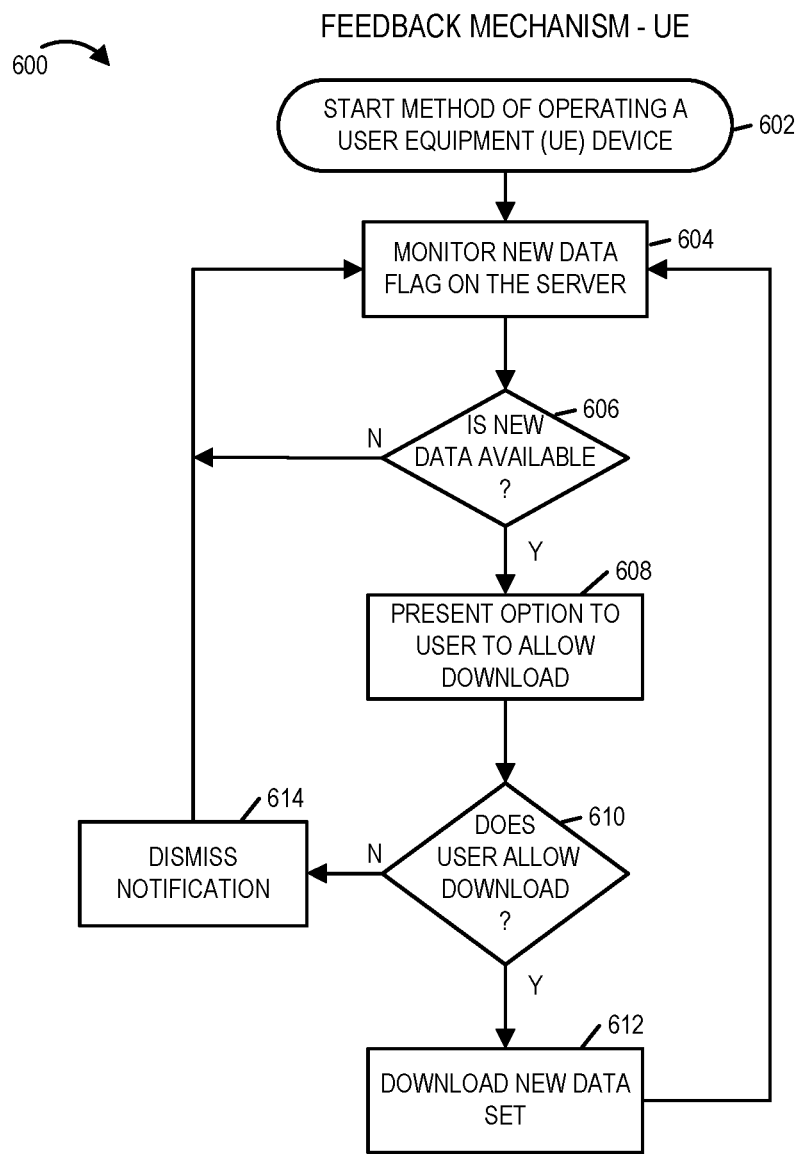
FIG. 7 is a drawing of a flowchart of an exemplary method of operating a UE device in accordance with an exemplary embodiment, said method including monitoring for notification of new data availability from a server and optionally downloading a new data set.

FIG. 7 is a drawing of a flowchart of an exemplary method 600 of operating a UE device in accordance with an exemplary embodiment, said method including monitoring for notification of new data availability from a server and optionally downloading a new data set. Operation starts in step 602 and proceeds to step 604. In step 604 the UE monitors a new data flag on the server. Operation proceeds from step 604 to step 606. In step 606 the UE determines if new data is available, e.g., based on the value of the new data flag. If the determination of step 606 is that new data for the UE is not available, then operation proceeds from step 606 to step 604 for additional monitoring of the new data flag on the server. However, if the determination of step 604 is that new data is available, e.g. based on the value of the new data flag, then operation proceeds from step 606 to step 608, in which the UE device presents to the user of the UE, and option to allow download of a new data set. Operation proceeds from step 608 to step 610. In step 610 the UE determines if the user allows download. In some embodiments, in step 610 the UE device monitors for and receives input from the user indicating whether or not the user allows the download. If the determination of step 610 is that the user is not allowing the download, then operation proceeds from step 610 to step 614, in which the UE device dismisses the notification, and operation proceeds from step 614. Alternatively, if the determination of step 610 is that the user is allowing the download, then operation proceeds from step 610 to step 612, in which the UE device downloads the new data set, e.g., new service bubble. Operation proceeds from step 614 or step 612 to step 604 for additional monitoring of the new data flag on the server.

Figure 8:
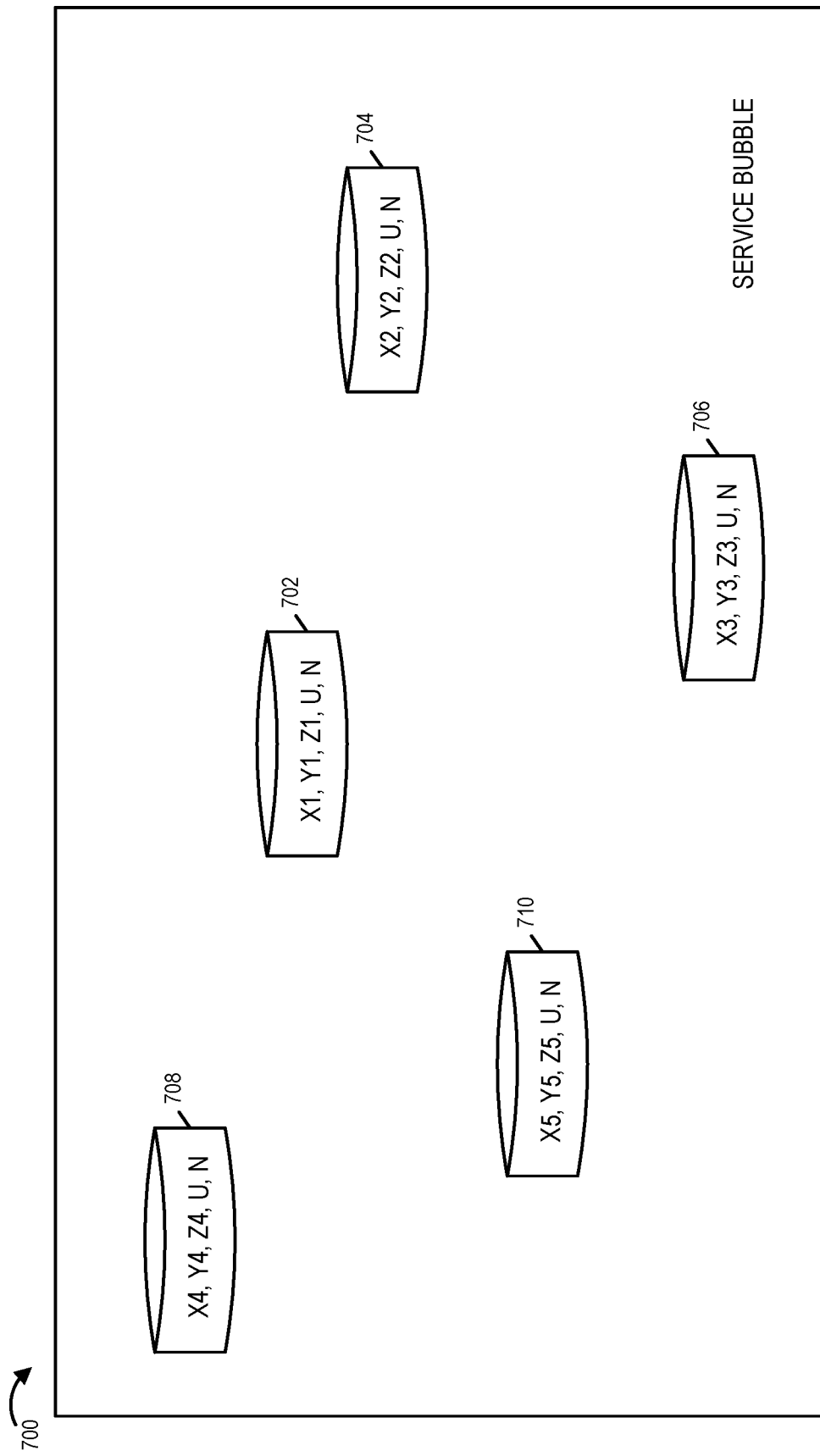
FIG. 8 is a drawing of an exemplary service bubble in accordance with an exemplary embodiment.

FIG. 8 is a drawing of an exemplary service bubble 700 for an exemplary UE including five different data sets (702, 704, 706, 708, 710) corresponding to different pairing of selection criteria and subscriptions in accordance with an exemplary embodiment. X, Y, Z represents position coordinates, U represented UE attributes, and N represents network attributes.

Figure 9:
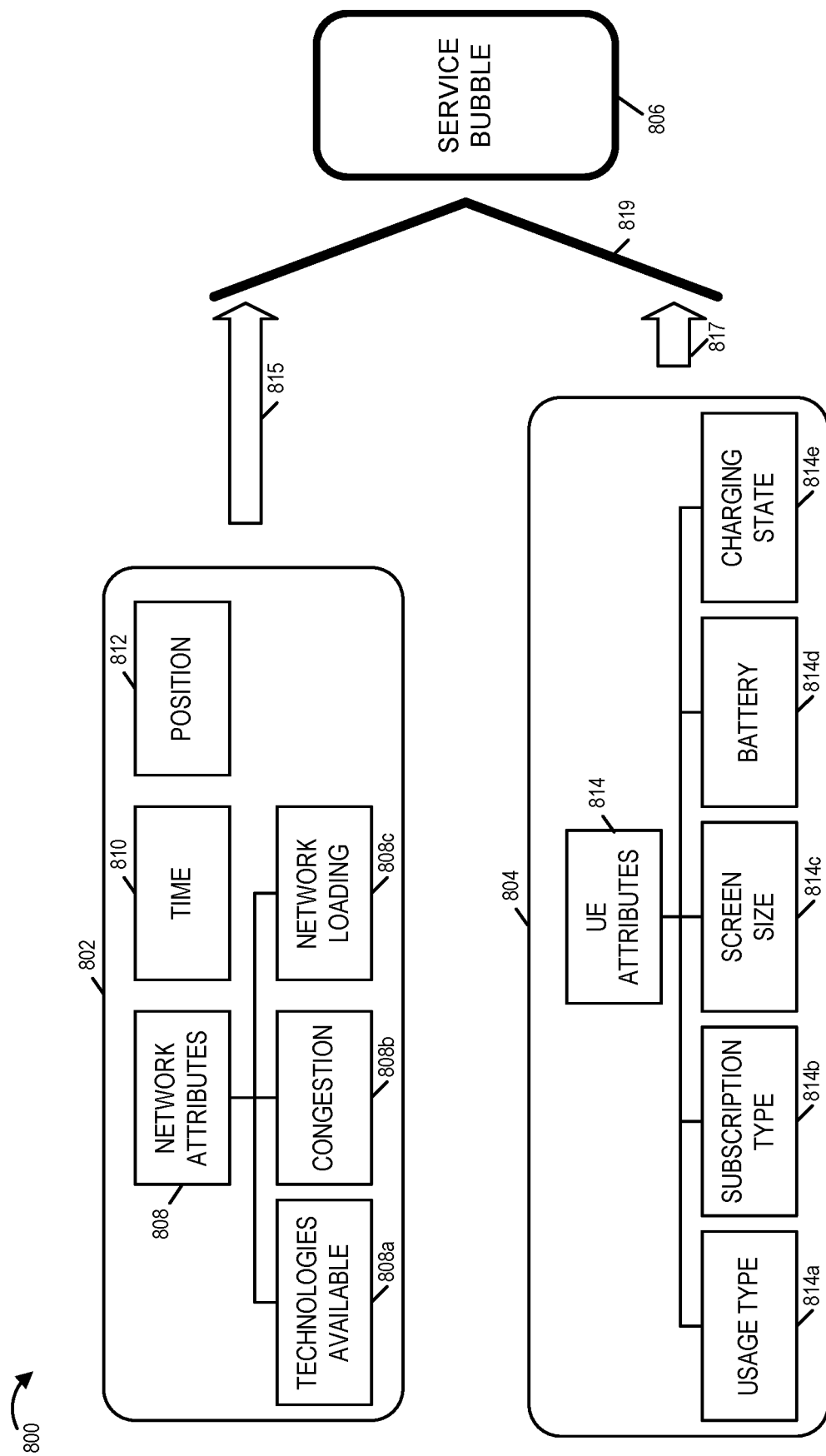
FIG. 9 is a drawing illustrating exemplary information input to generate a service bubble in accordance with an exemplary embodiment, said information including network attributes, time, position, and UE attributes.

FIG. 9 is a drawing 800 illustrating exemplary information input used by a server to generate a service bubble for an exemplary user equipment (UE) device in accordance with an exemplary embodiment, said information including network attributes, time, position, and UE attributes. First set of inputs 802 includes network attributes 808 including technologies available 808a, congestion 808b, and network loading 808c, time 810 and position 812. Second set of inputs 804 includes UE attributes 814 including usage type 814a, subscription type 814b, screen size 814c, battery 814d, and charging state 814e. The input information 802, 804 is input to a bubble generation routine as indicated by arrows 815, 817, combined as indicated by arrow 819 and used to generate a service bubble 806.

Figure 10:
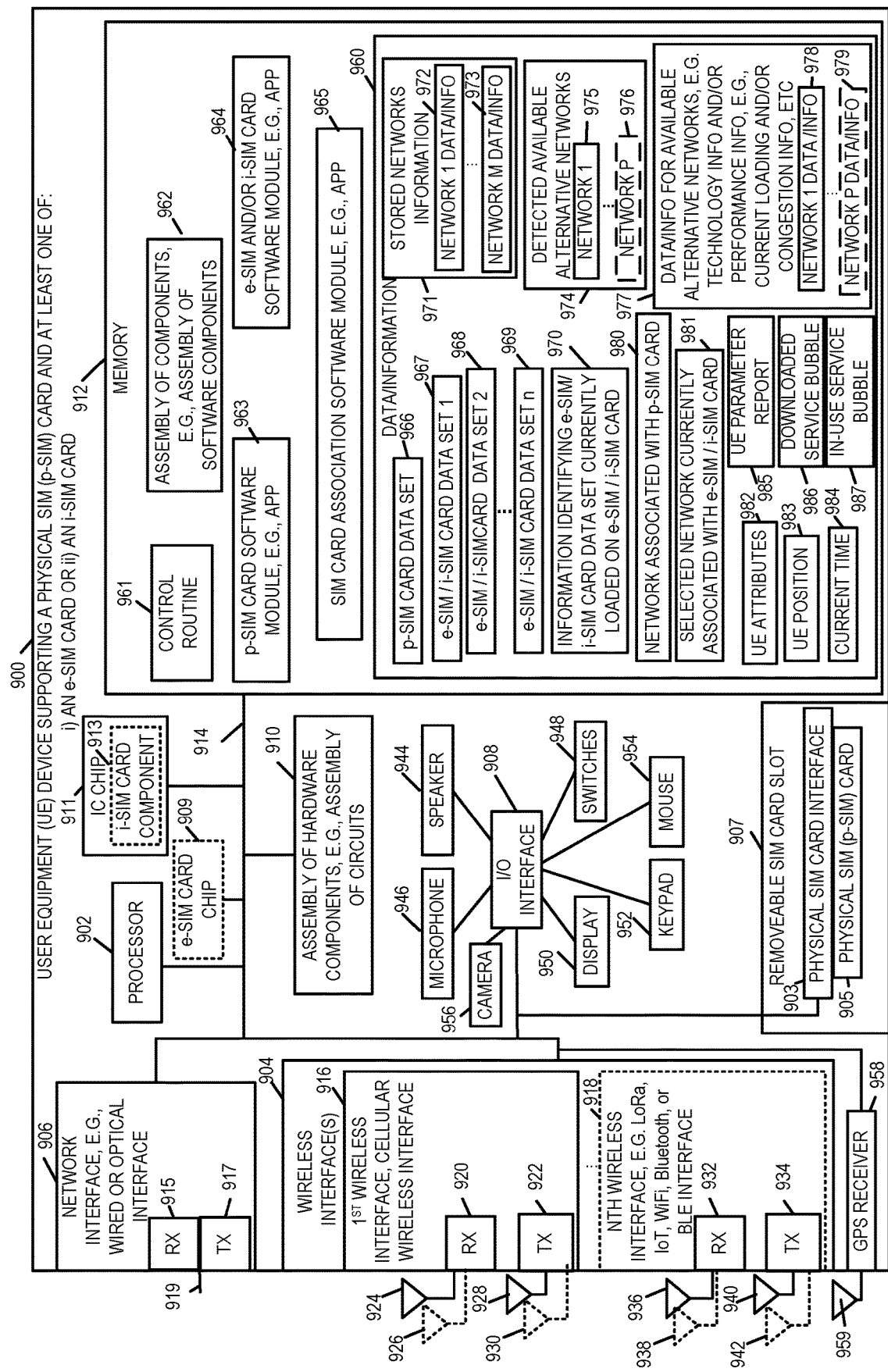
FIG. 10 is a drawing of an exemplary user equipment (UE) device in accordance with an exemplary embodiment, said UE device supporting a physical SIM (p-SIM) card and at least one of i) an e-SIM car or ii) an i-SIM card.

FIG. 10 is a drawing of an exemplary user equipment (UE) device 900 in accordance with an exemplary embodiment, said UE device supporting a physical SIM (p-SIM) card and at least one of i) an embedded SIM (e-SIM) card or ii) an integrated SIM (i-SIM) card. UE device 900 is, e.g., any of UEs (UE 1 1540, UE 2 1542, UE 3 1544, UE 4 1546, UE 5 1548, UE 6 1550, UE 7 1552, UE 8 1554, UE 9 1556, UE 10 1558, UE 11 1560, . . . , UE K 1562) of FIG. 1, a UE implementing the method of flowchart 200 of FIG. 3, a UE implementing the method of flowchart 300 of FIG. 4, a UE implementing the method of flowchart 400 of FIG. 5, a UE implementing the method of flowchart 600 of FIG. 7, a UE implementing the method of flowchart 1200 of FIG. 13, control server 1301 of FIG. 14, and/or a UE device described with respect to any of the Figures.

UE device 900 includes a processor 902, e.g., a CPU, wireless interfaces 904, network interface 906, an I/O interface 908, an assembly of hardware components 910, e.g., an assembly of circuits, memory 912, a physical SIM (p-SIM) card interface 903, and a Global Positioning System (GPS) receiver 958 coupled to bus 914, via which the various elements may interchange data and information. UE device 900 includes a physical SIM (p-SIM) card 905 within its removable SIM card slot 907 and coupled by physical SIM card interface 903 to bus 914. Exemplary UE device 900 includes one or both of: an e-SIM card chip 909 coupled to bus 914, or ii) an IC chip 911 including an i-SIM card component 913 coupled to bus 914.

Wireless interfaces 904 includes a plurality of wireless interfaces (1st wireless interface 916, e.g., a cellular wireless interface, . . . , Nth wireless interface 918, e.g., a LoRa interface, a IoT interface, a WiFi interface, a Bluetooth interface, or a Bluetooth low energy (BLE) interface). 1st wireless interface 916 includes a wireless receiver 920 coupled to one or more receive antennas or antenna elements (924, . . . , 926) and a wireless transmitter 922 coupled to one or more transmit antennas or antenna elements (928, . . . , 930). Nth wireless interface 918 includes a wireless receiver 932 coupled to one or more receive antennas or antenna elements (936, . . . , 938) and a wireless transmitter 934 coupled to one or more transmit antennas or antenna elements (940, . . . , 942). Network interface 906, e.g., a wired or optical interface, includes a receiver 915 and a transmitter 914, coupled to output connector 919.

UE 900 further includes a plurality if I/O devices (speaker 944, microphone 946, switches 948, display 950, e.g., a touch screen display, keypad 952, mouse 954, and camera 956) coupled to I/O interface 808, which couples the I/O devices to bus 914 and to other elements in device 900.

Memory 912 includes a control routine 961, an assembly of components 962, e.g., an assembly of software components, e.g., routines, subroutines, modules, etc., a p-SIM card software module 963, an e-SIM and/or i-SIM card software module 964, a SIM card association software module 965, and data/information 960. Data/information 960 includes a p-SIM card data set 966, a plurality of e-SIM and/or i-SIM card data sets (e-SIM/i-SIM card data set 1 967, e-SIM/i-SIM card data set 2 967, . . . , e-SIM/i-SIM card data set n 969), and stored networks information 971. Stored networks information 971 includes information corresponding a plurality of networks, e.g., networks to which the user of device 900 has a subscription, (network 1 data/information 972, . . . , network M data/information 973). Data/information 960 further includes detected available alternative networks 974, e.g., a list of detected available alternative networks which may be used by UE 900 at its current location (network 1 975, . . . , network P 976), and data/information 977 for available alternative networks, e.g., technology information and/or performance information, e.g., current loading information and/or congestion information, etc. (network 1 data/information 978, . . . , network P data/information 979). Technology information includes, e.g., type of interface and/or protocol being used by the network, e.g., WiFi, Bluetooth, BLE, IoT, LoRa, etc., power level information and/or number of UEs which can supported concurrently by the network, e.g., by an access point or base station or GW.

Data/information 960 further includes information 970 identifying an e-SIM/i-SIM card data set currently loaded on an e-SIM/i-SIM card, a network associated with the p-SIM card 980, a selected network currently associated with e-SIM/i-SIM card 981, UE attributes 982, UE position 983, current time 984, a generated UE parameter report 985 to be sent to a server, a downloaded service bubble 984, e.g. an updated service bubble downloaded from a server, and a current in-use service bubble 985 including, e.g., informing including pairing of particular networks with particular sets of criteria at particular locations, e.g. used for network selection.

Figure 11:
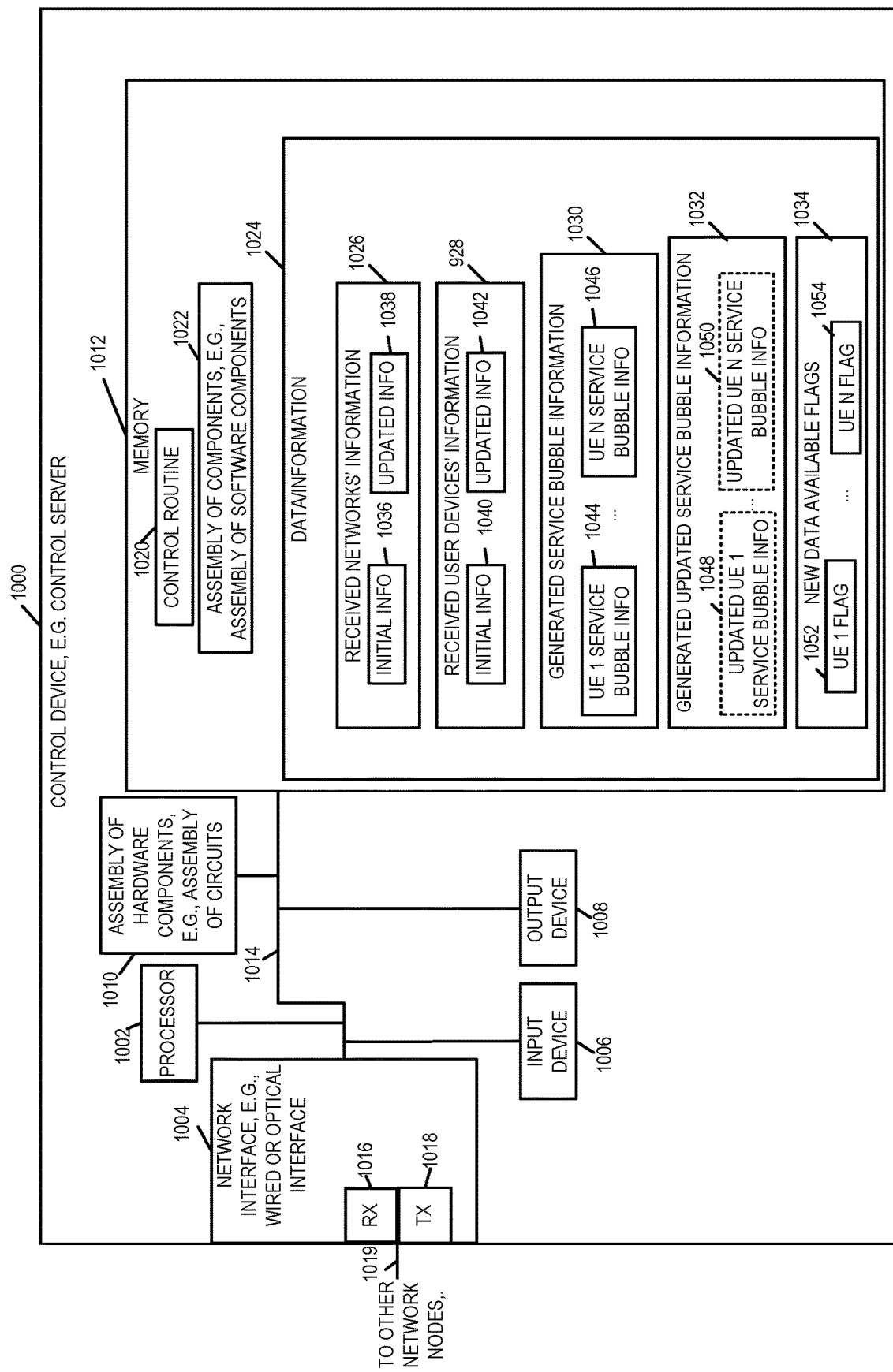
FIG. 11 is a drawing of an exemplary control device, e.g., a control server, in accordance with an exemplary embodiment.
Figure 12A:
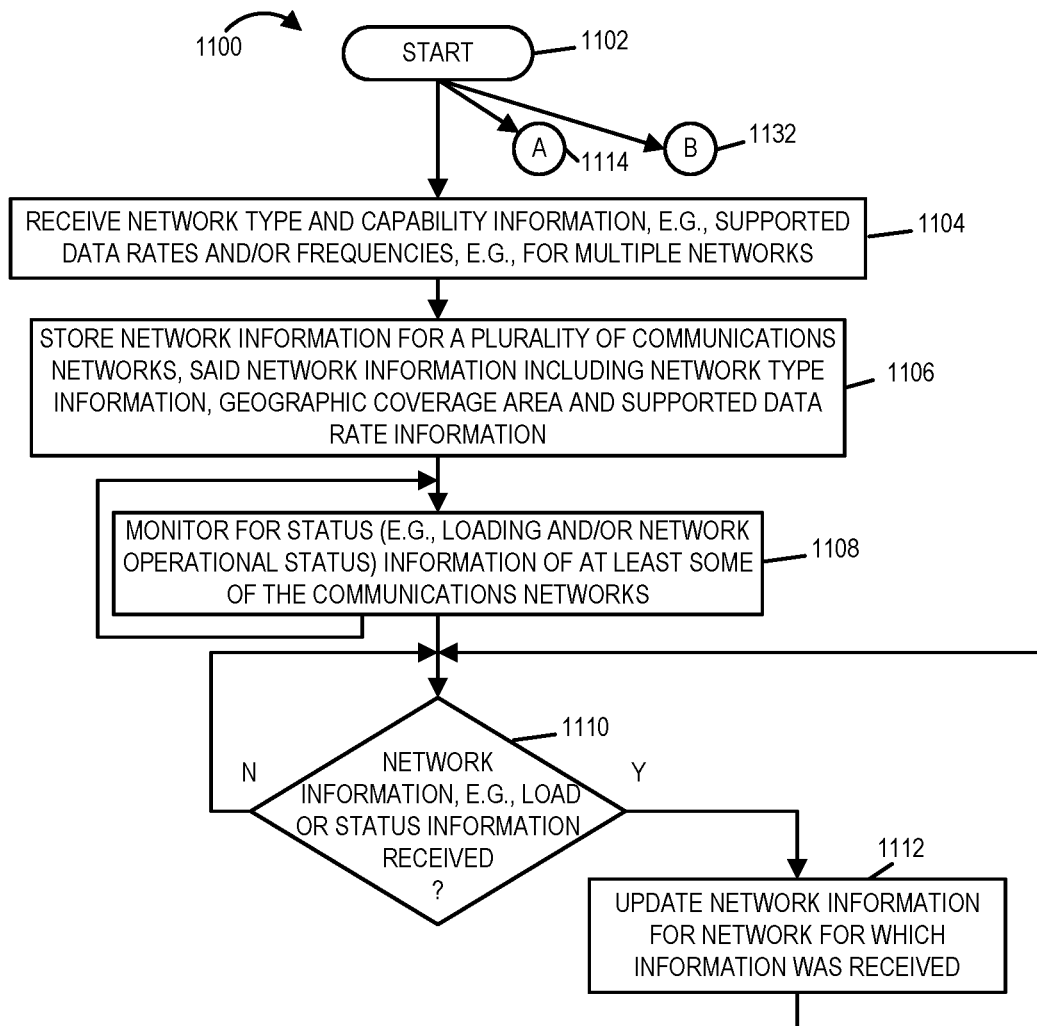
FIG. 12A is a first part of a flowchart of an exemplary method of operating a control device in accordance with an exemplary embodiment.
Figure 12B:
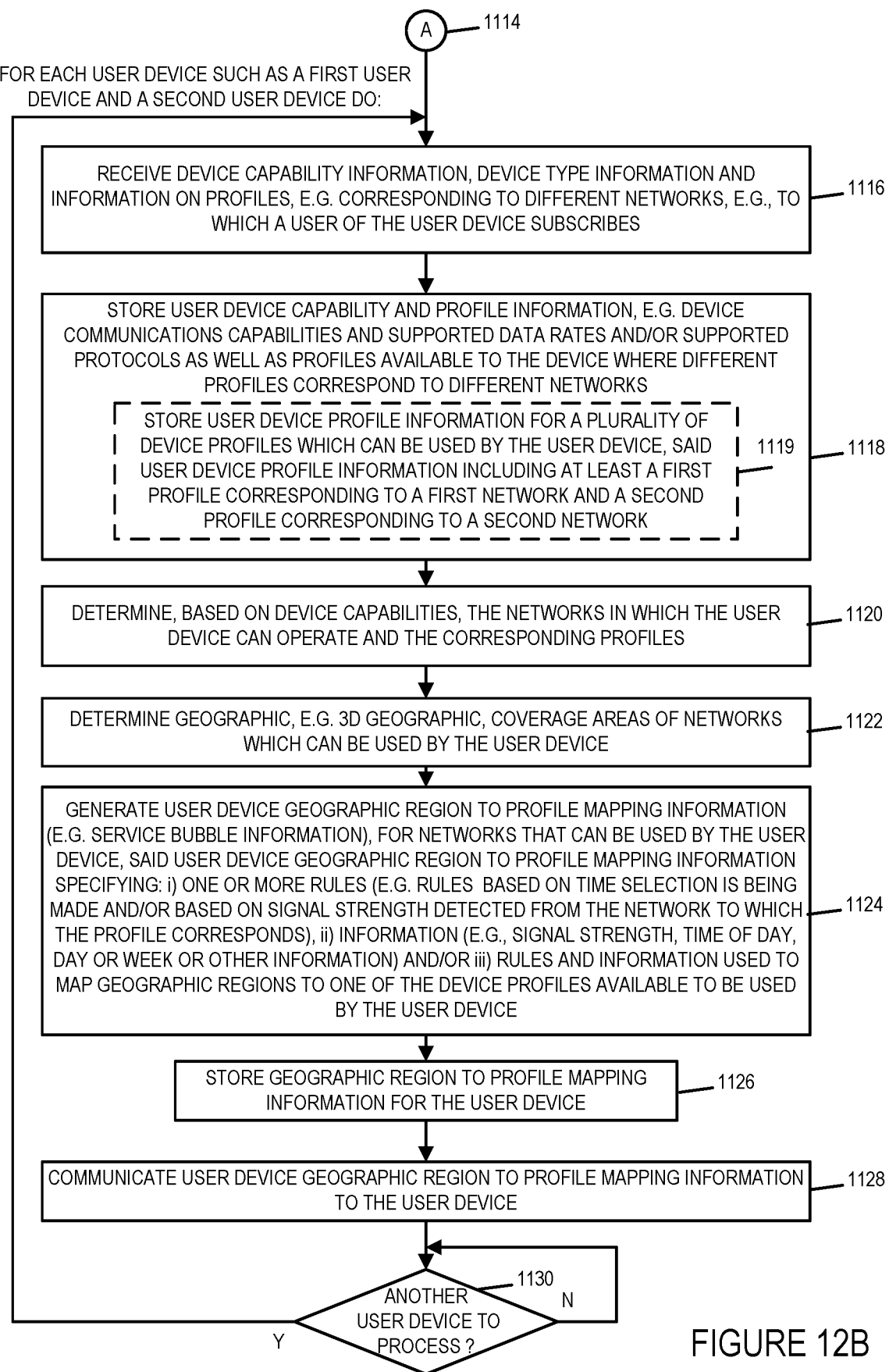
FIG. 12B is a second part of a flowchart of an exemplary method of operating a control device in accordance with an exemplary embodiment.
Figure 12C:
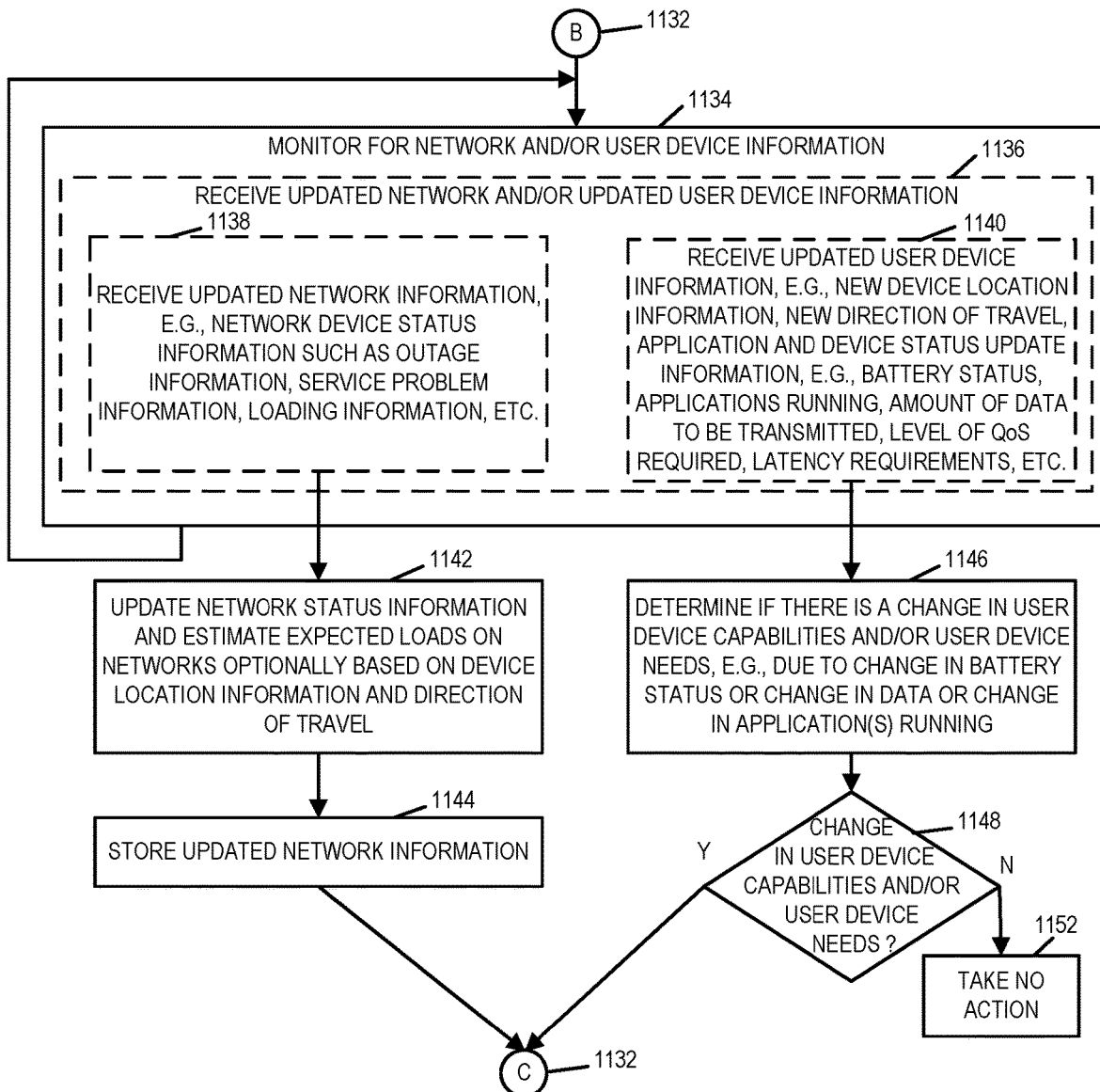
FIG. 12C is a third part of a flowchart of an exemplary method of operating a control device in accordance with an exemplary embodiment.
Figure 12D:
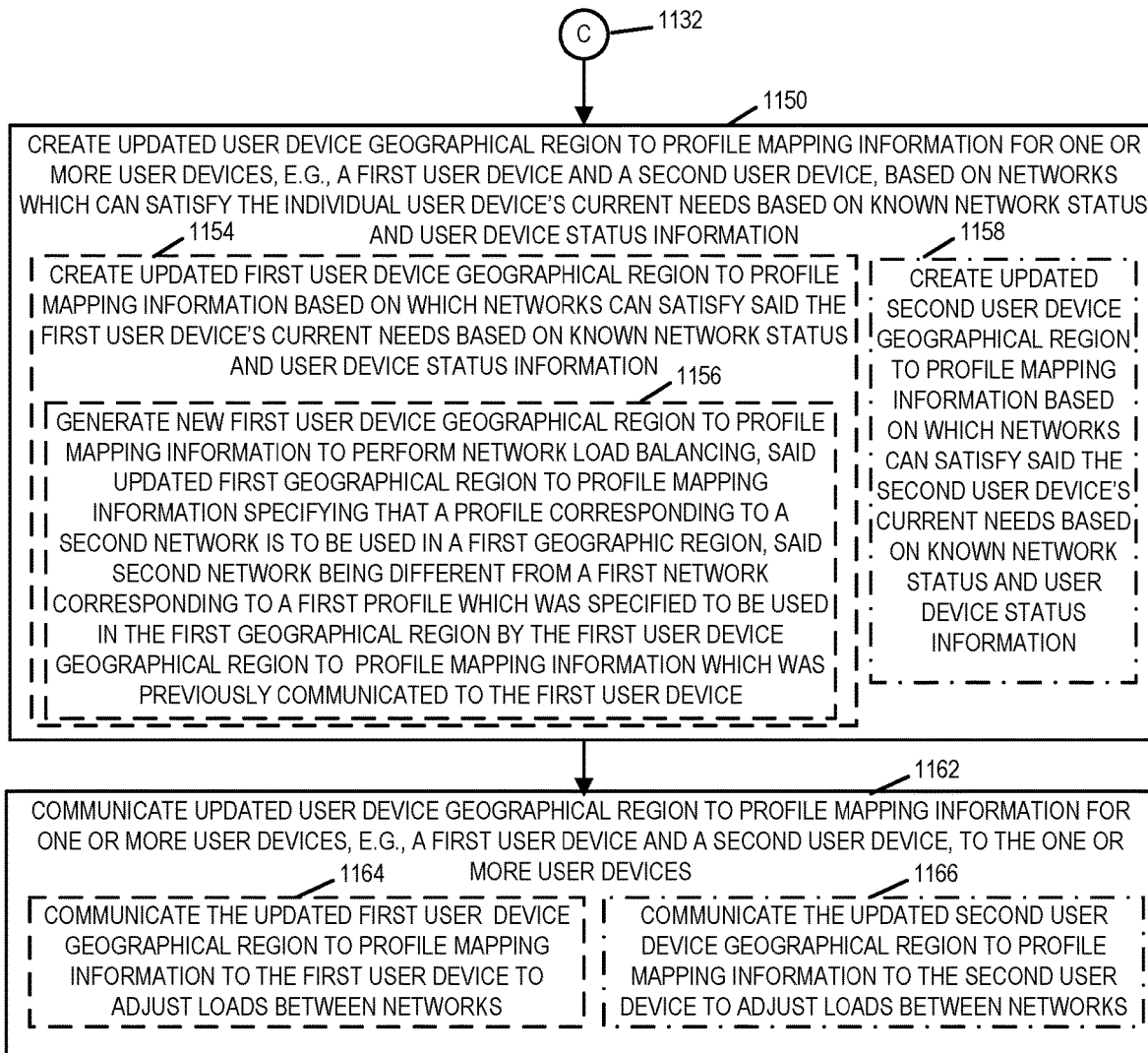
FIG. 12D is a fourth part of a flowchart of an exemplary method of operating a control device in accordance with an exemplary embodiment.

FIG. 11 is a drawing of an exemplary control device 1000, e.g., a control server, in accordance with an exemplary embodiment. Control device 1000 is, e.g., any of control device 1502 of FIG. 1, a server implementing the method of flowchart 100 of FIG. 2, a server implementing the method of flowchart 500 of FIG. 6, a control device implementing the method of flowchart 1100 of FIG. 12, control server 1301 of FIG. 14, and/or a control device or server described with respect to any of the Figures.

Control device 1000 includes a processor 1002, e.g., a CPU, a network interface 1004, e.g., a wired or optical interface, an input device 1006, e.g., a keyboard and/or mouse, an output device 1008, e.g., a display, an assembly of hardware components 1010, e.g., and assembly circuits and memory 1012 coupled together via a bus 1014 over which the various elements may interchange data and information.

Memory 1012 includes a control routine 1020, an assembly components 1022, e.g. an assembly of software components, e.g., modules, routines, sub-routines, applications, etc. and data/information 1024. Data/information 1024 includes received networks; information 1026, received user devices' information 1028, generated service bubble information 1030, generated updated service bubble information 1032, and new data available flags.

Received networks information 1026 includes initial information 1036 and updated information. Exemplary received networks' information 1026 includes service provider network information corresponding to a plurality of service provider networks, e.g., service provider network 1 information 1302, . . . , service provider network M information 1304 of FIG. 13.

Received user devices' information 1028 includes initial information 1040 and updated information 1042. Exemplary received user devices' information 1028 includes information corresponding to a plurality of user devices, e.g., user device 1 information 1314, . . . , user device N information 1316 of FIG. 14.

Generated service bubble information 1030 includes service bubble information corresponding to a plurality of user devices (UE 1 service bubble information 1044, . . . , UE N service bubble information 1046. Exemplary UE 1 service bubble information 1044 includes, e.g., UE device 1 criteria to network matching information 1330 of FIG. 14 which includes sets of matching information for a plurality of different geographic areas, said matching information used to determine which network is to be used by UE 1. Exemplary UE N service bubble information 1046 includes, e.g., UE device N criteria to network matching information 1332 of FIG. 14 which includes sets of matching information for a plurality of different geographic areas, said matching information used to determine which network is to be used by UE N.

Generated updated service bubble information 1032 includes updated service bubble information corresponding to one or more user devices (updated UE 1 service bubble information 1048, . . . , updated UE N service bubble information 1050). Different service bubbles may be, and sometimes are updated at different times.

New data available flags 1034 includes new data flags for each of the user devices (UE 1 flag 1052, . . . , UE N flag 1054). A new data available flag indicates, e.g., by being set to a value of 1, that an updated service bubble, corresponding to the UE, has been generated and is available to be uploaded by the UE. In some embodiments, after the updated service bubble has been successfully uploaded into the UE, the flag is cleared, e.g., set to a value of 0.

Figure 14:
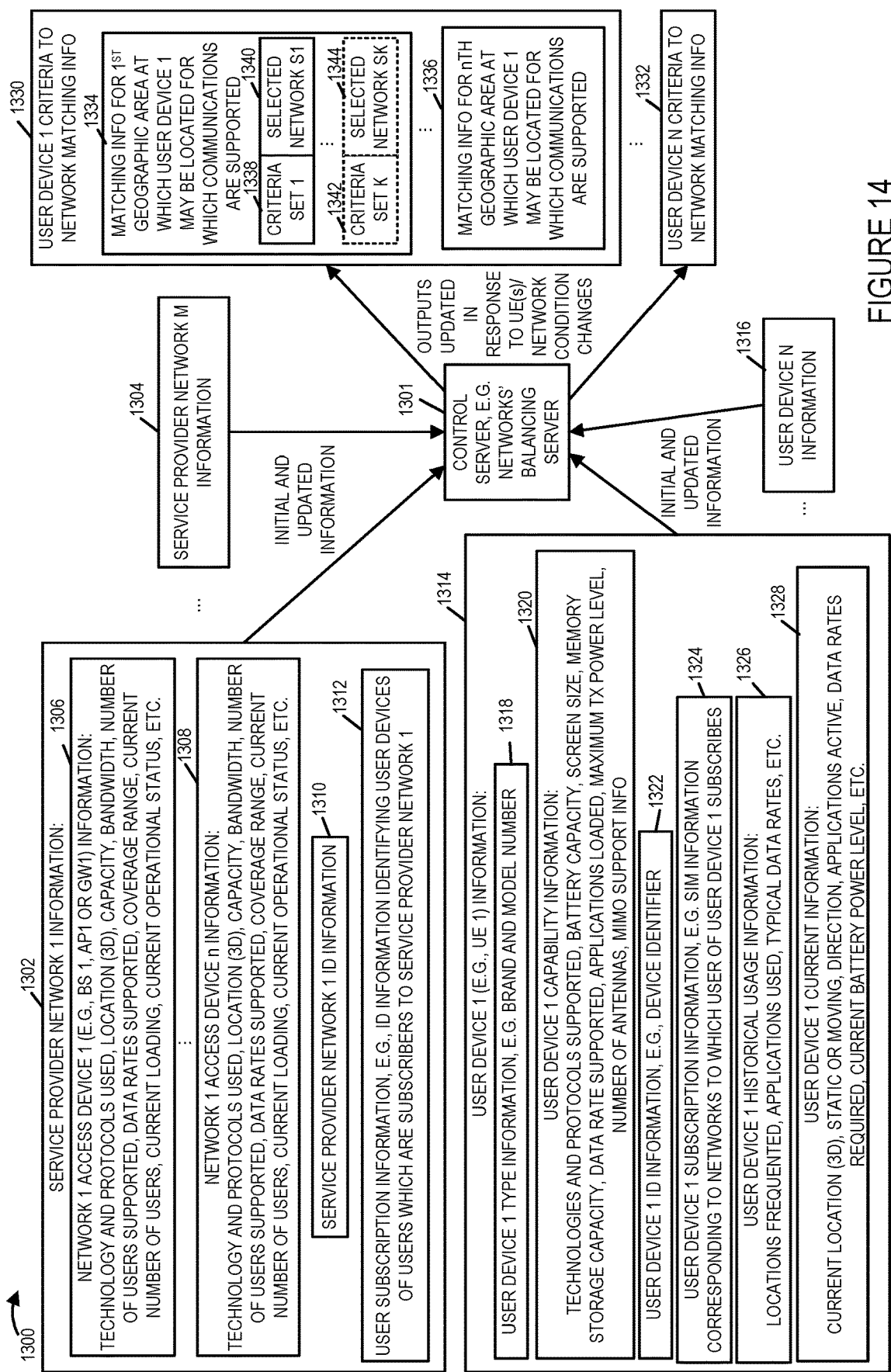
FIG. 14 is a drawing illustrating an exemplary control server receiving information corresponding to a plurality of service provider networks and information from user devices and generating, based on the received information output information, e.g. service bubble information, to be communicated to and used by the user equipment devices to determine which network to select to use in particular geographic area.

FIG. 12, comprising the combination of FIG. 12A, FIG. 12B, FIG. 12C and FIG. 12D, is a flowchart 1100 of an exemplary method of operating a control device, e.g., a control server, in accordance with an exemplary embodiment. the control device implementing the method of flowchart 1100 is, e.g., control device 1000 of FIG. 11 or control server 1301 of FIG. 14. Operation starts in step 1102 in which the control device is powered on and initialized. Operation proceeds from start step 1102 to step 1104. Operation also proceeds from step 1102, via connecting node A 1114 to step 1116 (see FIG. 12B) and via connecting node B 1132 to step 1134 (see FIG. 12C).

Returning to step 1104, in step 1104 the control device receives network type and capability information, e.g., supported data rates and/or frequencies, e.g., for multiple networks. Operation proceeds from step 1104 to step 1106. In step 1106 the control device stores the network information for a plurality of communications networks, said network information including network type information (e.g., CDMA, OFDM, WiFi, etc.). geographic coverage area information (e.g., with at least some of the communications networks corresponding to different geographic regions) and supported data rate information (e.g., which data rates the network supports). The network information also includes, in some embodiments, the frequency range or ranges used by the individual communications networks. Operation proceeds from step 1106 to step 1108. In step 1108 the control device monitors for status, e.g., loading and/or network operational status, information of at least some of the communications networks. Step 1108 is performed repetitively on an ongoing basis. Operation proceeds from step 1108 to step 1110.

In step 1110, the control device checks if network information, e.g., load or status information, was received. If network information was not received, then operation proceeds from step 1110 to the input of step 1110 for another check at a later time. However, if the check of step 1110 determined that network information was received, then operation proceeds from step 1110 to step 1112, in which the control device updates network information for the network for which the information was received. Operation proceeds from step 1112 to the input of step 1110 for another check at a later time.

Returning to step 1116, in step 1116, the control device receives device capability information, device type information and information on profiles, e.g. corresponding to different networks, e.g. to which a user of the user device subscribes. Operation proceeds from step 1116 to step 1118. In step 1118 the control device stores user device capability and profile information, e.g., device communications capabilities and supported data rates and/or supported protocols as well as profiles available to the device where different profiles correspond to different network. Step 1118 includes step 1119, in which the control device stores user device profile information for a plurality of device profiles which can be used by the user device, said user device profile information including at least a first profile corresponding to a first network and second profile corresponding to a second network. Operation proceeds from step 1118 to step 1120.

In step 1120 the control device determines, based on device capabilities, the networks in which the user device can operate and the corresponding profiles. Operation proceeds from step 1120 to step 1122.

In step 1122 the control device determines geographic, e.g., 3-dimension (3D) geographic, coverage areas of networks which can be used by the user device. Operation proceeds from step 1122 to step 1124.

In step 1124 the control device generates user device geographic region to profile mapping information (e.g., service bubble information) for networks that can be used by the user device, said user device geographic region to profile mapping information specifying i) one or more rules (e.g., rules based on time selection is being made and/or based on signal strength detected from the network to which the profile corresponds), ii) information (e.g., signal strength, time of day, day of week or other information) and/or iii) rules and information used to map geographic regions to one of the device profiles available to be used by the user device. Operation proceeds from step 1124 to step 1126.

In step 1126 the control device stores geographic region to profile mapping information for the user device. Operation proceeds from step 1126 to step 1128. In step 1128 the control device communicates the user device geographic region to profile mapping information to the user device. In some embodiments, the geographic region to profile mapping information indicates one or more three dimensional (3D) spatial regions (e.g., service bubbles) in which the user device can or is to use a first profile corresponding to a first communications network and or more 3D spatial regions in which the use device can or is to use a second profile corresponding to a second communications network. In some embodiments, the user device geographic region to profile mapping information indicates both geographic regions for which a first profile is to be used and a time (e.g., time of day or day of week) rule specifying particular times the first profile is available for use in the indicated geographic regions. Operation proceeds from step 1128 to step 1130.

In step 1130 the control device determines if there is another user device to process. If the determination of step 1130 is that there is another user device to process then operation proceeds from step 1130 to the input of step 1116. Thus, one iteration of steps 1116, 1118 including 1119, 1120, 1122, 1124, 1126, 1128, is performed for each user device such as for a first user communications device capable of connecting to a second plurality of communications network and second user communications device capable of connecting to a first plurality of communications network, where the first plurality of communications networks is the same or different than the second plurality of communications networks. If the determination of step 1130 is that there is not currently another user device to process then operation proceeds from step 1130 to the input of step 1130 for another check at a later point in time.

Returning to step 1134, in step 1134 the control device monitors for network and/or user device information. Step 1134 is performed repetitively on an ongoing basis. Step 1134 may, and sometimes does, include step 1136 in which the control device receives updated network information (e.g., updated network device status information such as loading or outage information) and/or updated user device information (e.g., new location information, updated battery status information, amount of data to be transmitted, QoS requirements, latency requirements, etc.). An iteration of step 1136 includes one or both of steps 1138 and 1140. In step 1138 the control device receives updated network information, e.g., network device status information such as outage information, service problem information, loading information, etc. Operation proceeds from step 1138 to step 1142. In step 1142 the control device updates network status information and estimates expected loads on networks optionally based on device location information and direction of travel. Operation proceeds from step 1142 to step 1144, in which the control device stores the updated network information. Operation proceeds from step 1144, via connecting node C 1132 to step 1150 (see FIG. 11D).

Returning to step 1140, in step 1140 the control device receives updated user device information, e.g., new device location information, new device direction of travel information, application and device status update information, e.g., battery status information, information indicating application running, information indicating amount of data to be transmitted, information indicating level of Quality-of-Service (QoS) required, information indicating latency requirements, etc. Operation proceeds from step 1140 to step 1146. In step 1146 the control device determines if there is a change in user device capabilities and/or user device needs, e.g., due to a change in battery status or change in data or change in application(s) running. Operation proceeds from step 1146 to step 1148. In step 1148 if the determination is that is not a change in user device capabilities and/or user device needs, then operation proceeds from step 1148 to step 1152, in which the control device takes no action. However, if the determination is that there is a change in user device capabilities and/or user device needs then operation proceeds from step 1148, via connecting node C 1132 to step 1150 (see FIG. 12D).

In step 1150 the control device creates updated user device geographical region to profile mapping information for one or more user devices, e.g., a first user communications device and a second user communications device, based on networks which can satisfy the individual user device's current needs based on known network status and user device status information. Step 1150 includes one or both of step 1154 and 1158.

In step 1154 the control device creates updated first user device geographical region to profile mapping information based on which networks can satisfy the first user device's current needs based on known network status and user device status information. Step 1154 may, and sometimes does, include step 1156 in which the control device generates new first user device geographical region to profile mapping information to perform network load balancing, said updated first geographical region to profile mapping information specifying that a profile corresponding to a second network is to used in a first geographical region, said second network being different from a first network corresponding to a first profile which was specified to be used in the first geographical region by the first user device geographical region to profile mapping information which was previously communicated to the first user device. In some embodiments, received updated network information indicated a decrease in loading on the second network or an increase in loading on the first network, and said change in loading triggered the change in which profile is selected to be used in the first geographical region when creating the updated first device geographic region to profile mapping information.

In step 1158 the control device creates updated second user device geographical region to profile mapping information based on which networks can satisfy the second user device's current needs based on known network status and user device status information.

Operation proceeds from step 1150 to step 1162. In step 1162 the control device communicates the updated user device geographical region to profile mapping information for one or more users devices, e.g. a first user communications device and a second user communications device, to the one or more user devices. Step 1162, may and sometimes does, include one or both of steps 1164 and 1166. In step 1164 the control device communicates the first user device geographical region to profile mapping information to the first user device to adjust loads between networks. In step 1166 the control device communicates the second user device geographical region to profile mapping information to the second user device to adjust loads between networks.

Figure 13A:
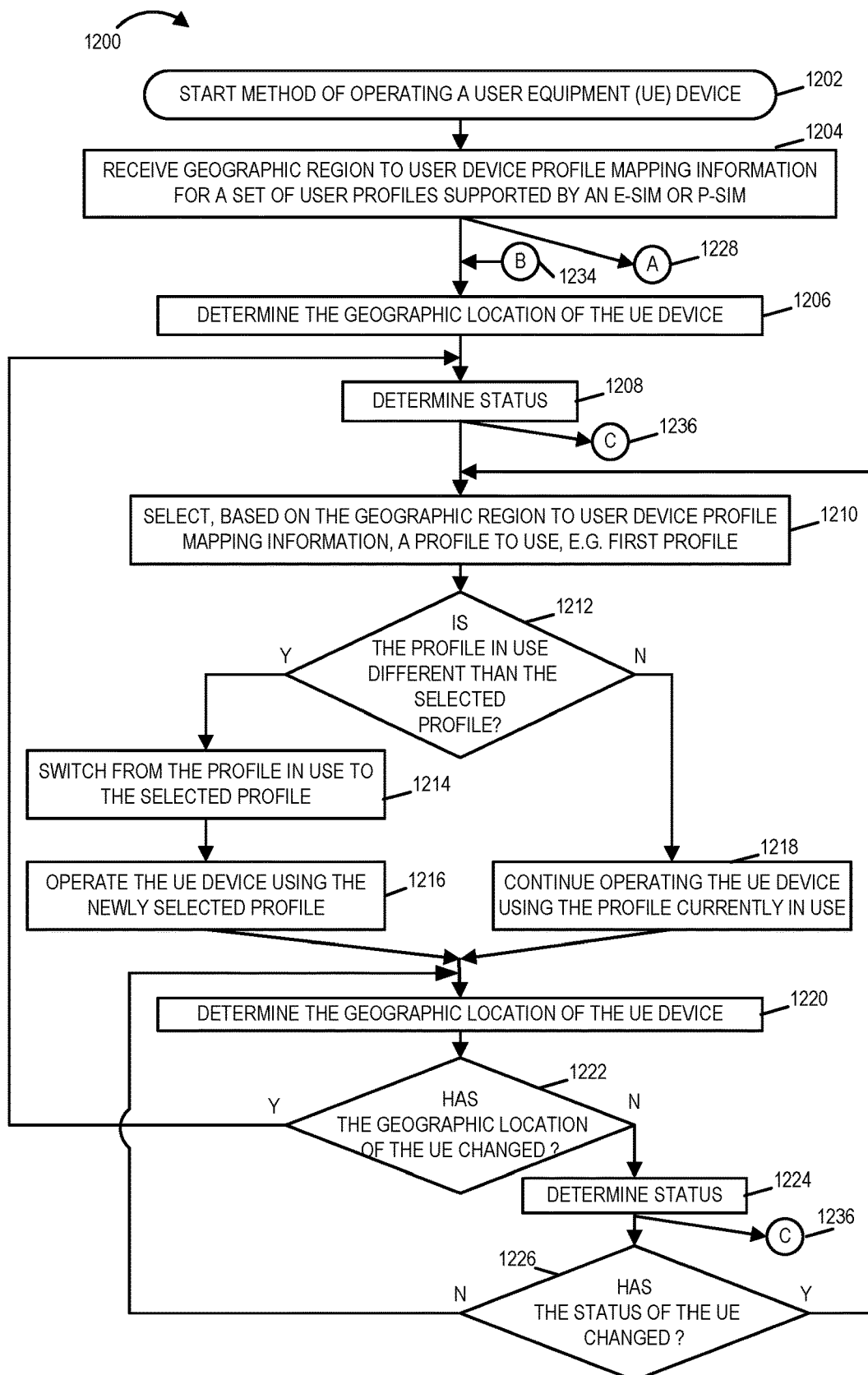
FIG. 13A is a first part of a flowchart of an exemplary method of operating a user equipment (UE) device in accordance with an exemplary embodiment.
Figures 13, 13A, 13B:
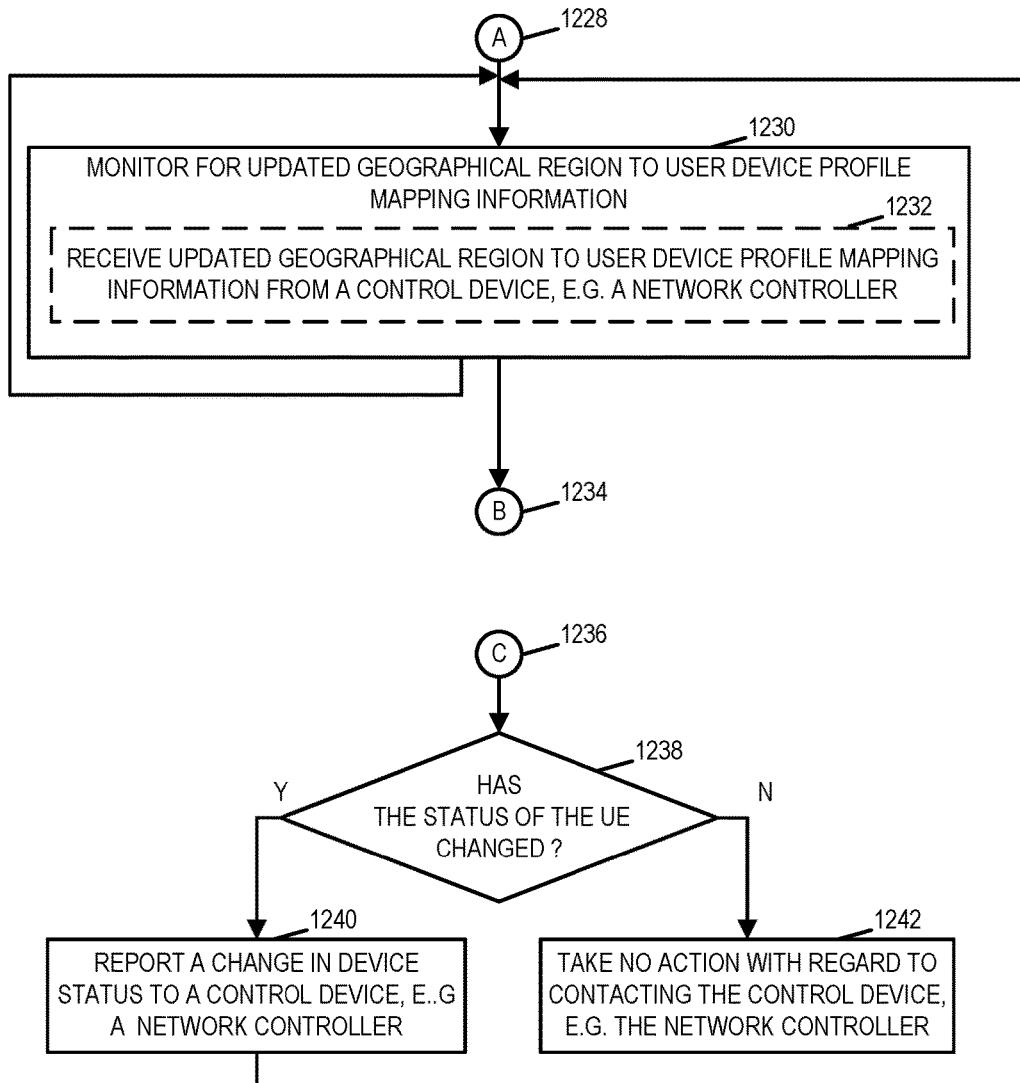
FIG. 13B is a second part of a flowchart of an exemplary method of operating a user equipment (UE) device in accordance with an exemplary embodiment.
FIG. 13 comprises the combination of FIG. 13A and FIG. 13B.

FIG. 13, comprising the combination of FIG. 13A and FIG. 13B, is a flowchart 1200 of an exemplary method of operating a user equipment (UE) device in accordance with an exemplary embodiment. Operation starts in step 1202, in which the UE device is powered on and initialized. In some embodiments, as part of the initialization the UE device starts using a profile which is designated as its default profile. Operation proceeds from start step 1202 to step 1204. In step 1204 the UE device receives geographic region to user device profile mapping information for a set of user profiles supported by an e-SIM or p-SIM. For example, one profile is supported by a p-SIM and a plurality of additional profiles are supported by an e-SIM. In some embodiments, the geographical region to user device profile mapping information provides 3D geographic region (e.g., service bubble) to profile mapping information. In some embodiments, the geographical regions to user device profile mapping information includes profile selection rules which are based on: geographical location and one or more of: i) an amount of data to be transmitted by the UE device, ii) UE device data latency requirements, and iii) UE device battery status. Operation proceeds from step 1204 to step 1206. Operation also proceeds from step 1204, via connecting node A 1228 to step 1230 (see FIG. 12B).

Returning to step 1206, in step 1206 the UE device determines the geographic location of the UE device. Operation proceeds from step 1206 to step 1208. In step 1208 the UE device determines status. Operation proceeds from step 1208 to step 1210. Operation also proceeds from step 1208, via connecting node C 1236 to step 1238 (see FIG. 13B).

Returning to step 1210, in step 1210 the UE device selects, based on the geographic region to user device profile mapping information, a profile to use, e.g., a first profile. Operation proceeds from step 1210 to step 1212.

In step 1212 the user device determines if the profile, which is currently in use, is different than the selected profile. If the determination of step 1212 is that the profile in use is different than the selected profile, then operation proceeds from step 1212 to step 1214, in which the UE device switches from the profile in use to the selected profile. Operation proceeds from step 1214 to step 1216. In step 1216 the UE device is operated using the newly selected profile. Alternatively, if the determination of step 1212 is that the profile in use is not different than the selected profile, then operation proceeds from step 1212 to step 1218, in which the UE device continues operating using the profile currently in use. Operation proceeds from step 1216 or step 1218 to step 1220.

In step 1220 the UE device determines the geographic location of the UE device. Operation proceeds from step 1220 to step 1222. In step 1222 the UE device determines if the geographic location of the UE has changed. For example, the UE device determines in step 1222 if the UE device has moved from a first location corresponding to a first geographic region to a second location corresponding to a second geographic region. If the determination of step 1222 is that the geographic location of the UE device has changed (e.g., the UE device has moved to a different geographic region) then operation proceeds from step 1222 to step 1208, in which the UE determines status again. Operation proceeds from step 1208 to step 1210, in which the UE selects, based on geographic region to user profile mapping information, a user profile to use. A change in geographic location of the UE device may, and sometimes does, cause the UE device to select a different profile than the profile currently in use.

Returning to step 1222, if the determination of step 1222 is that the UE device has not changed geographical location (e.g., the UE device has remained in the same geographic region), then operation proceeds to step 1224, in which the UE device determines status. Operation proceeds from step 1224 to step 1226 and via connecting node C 1236, to step 1238.

In step 1226 the UE device determines if the status of the UE has changed. If the determination of step 1226 is that the status of the UE has not changed then operation proceeds from step 1226 to the input of step 1220 for another determination of geographic locations at a later point in time, e.g., after a delay. However, if the determination of step 1226 is that the status of the UE has changed, then operation proceeds from step 1226 to step 1210, in which the UE device makes a selection, based on the geographic region to user profile mapping information, of a profile to use. A change in UE device status may, and sometimes does, cause the UE device to select a different profile than the profile currently in use.

Returning to step 1230, in step 1230 the UE device monitors for updated geographical region to user device profile mapping information. Step 1230 may, and sometimes does include step 1232, in which the UE device receives updated geographical region to user device profile mapping information from a control device, e.g., a network controller implementing network management including load balancing. The received updated geographical region to user device profile mapping information may be, and sometimes is, received after a change in network station (e.g., a change in network loading) and includes information indicating that a different profile should be used in at least one geographic region than was indicated by previously received user device profile mapping information. The received updated geographical region to user device profile mapping information may be, and sometimes is, based on reported updated network information (e.g., a change in network loading or a detected network access device failure or a new network access device being activated). The received updated geographical region to user device profile mapping information may be, and sometimes is, based on reported user device status information (e.g., from step 1240). Operation proceeds from step 1232, via connecting node B 1234, to step 1206.

Returning to step 1238, in step 1238 the UE device determines if the UE device has changed its status. If the determination of step 1238 is that the status of the UE device has changed, then operation proceeds from step 1238 to step 1240. In step 1240 the UE device reports the change in status to a control device, e.g., a network controller. Operation proceeds from step 1240 to the input of step 1230. Alternatively, if the determination of step 1238 is that the status of the UE device has not changed, then operation proceeds from step 1238 to step 1242. In step 1240 the UE device takes no action with regard to contacting the control device, e.g., the network controller.

FIG. 14 is a drawing 1300 illustrating an exemplary control server 1301 receiving information corresponding to a plurality of service provider networks (service provider network 1 information 1302, . . . , service provider network M information 1304) and information from user devices (user device 1 information 1314, . . . , user device N information 1316) and generating, based on the received information (1302, . . . , 1304, 1314, . . . , 1316) output information (1330, . . . , 1332), e.g. service bubble information, to communicated to and to be used by the user equipment devices to determine which network to select to use at a particular geographic area. Control server 1301 is, e.g., a networks' load balancing server.

Service provider network 1 information 1302 includes information (network 1 access device 1 information 1306, . . . , network 1 access device n information 1308) corresponding to a plurality of network 1 access devices (network 1 access device 1, . . . , network 1 access device n), service provider network 1 ID information 1310 and user subscription information, e.g., ID information identifying user devices of users which are subscribers to service provider network 1. Network 1 access device 1 information 1306 includes: technology and protocols used, location (3D), e.g., latitude, longitude and altitude, capacity, bandwidth, number of users supported, data rates supported, coverage range, current number of users, current loading, current operational status, etc. Similarly, network 1 access device n information 1306 includes: technology and protocols used, location (3D), e.g., latitude, longitude and altitude, capacity, bandwidth, number of users supported, data rates supported, coverage range, current number of users, current loading, current operational status, etc.

User device 1 information 1314 includes user device 1 type information 1318, e.g., brand and model number, user device 1 capability information 1320 including technologies and protocols supported, battery capacity, screen size, memory storage capacity, data rate supported, application loaded, maximum transmit power level, number of antennas, MIMO support information, user device 1 ID information 1322, e.g., a device identifier, user device 1 subscription information 1324, e.g., SIM information corresponding to networks to which the user of user device 1 subscribes, user device 1 historical usage information 1326, e.g., locations frequented, applications used, typical data rates, etc., and user device 1 current information 1328, e.g., current location (3D), static or moving, direction, application active, data rates required, current battery power level, etc.

The input service provider network information (service provider network 1 information 1302, . . . , service provider network M information 1304) includes initially provided information and updated information, e.g. in response to detected changes corresponding to the service provider networks. The input user device information (user device 1 information 1314, . . . , user device N information 1316) includes initially provided information and updated information, e.g., in response to UE changes.

Figure 15:
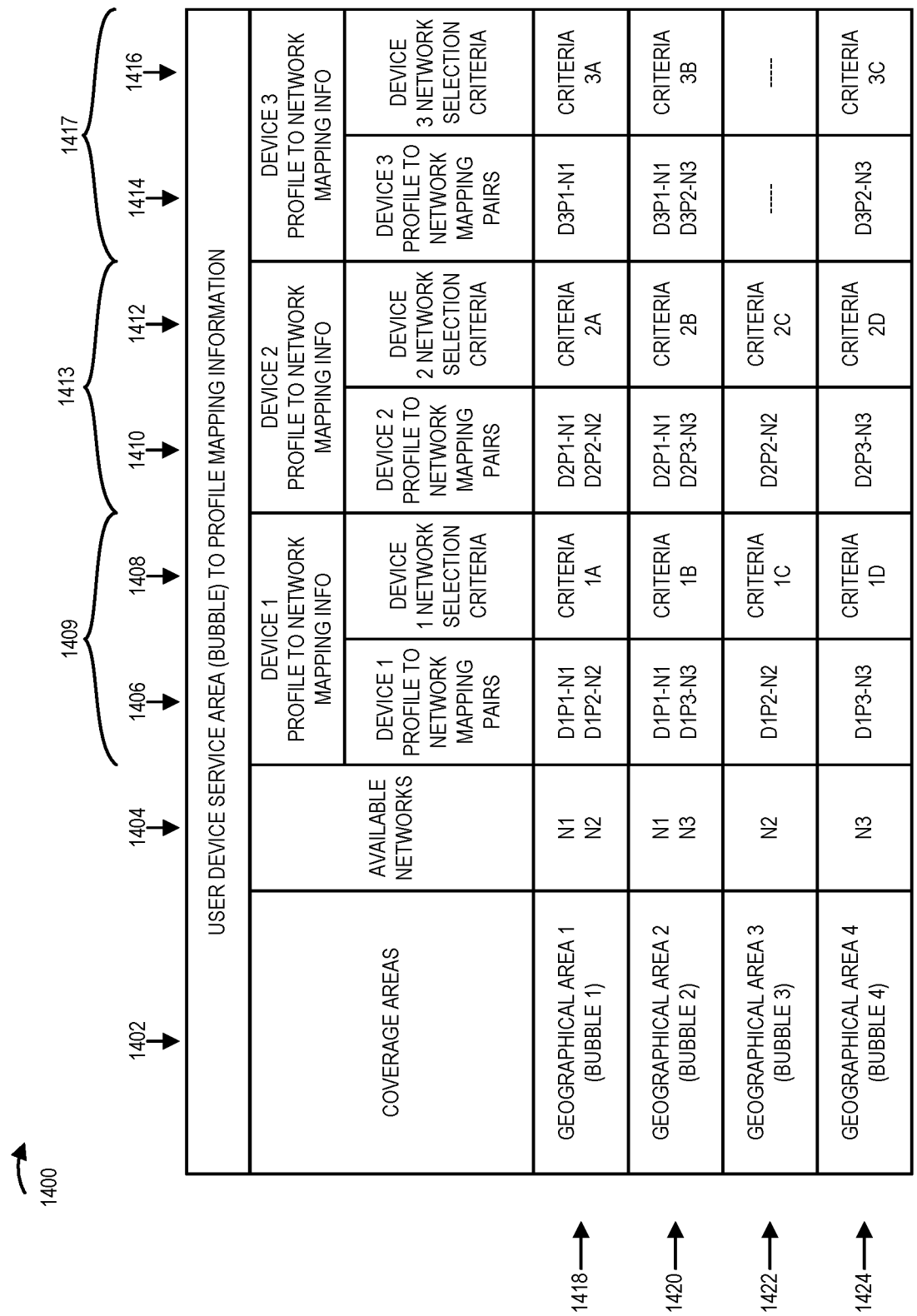
FIG. 15 is a drawing of a table illustrating profile to network mapping information and network selection criteria for a plurality of user devices corresponding to different coverage areas.

FIG. 15 is a drawing of a table 1400 illustrating profile to network mapping information and network selection criteria for a plurality of user devices corresponding to different coverage areas. First column 1402 identifies coverage areas. Second column 1404 identifies networks available. Third column 1406 identifies device 1 profile to network mapping pairs. Fourth column 1408 identifies device 1 network selection criteria. The combination of the third column 1406 and the fourth column 1408 includes device 1 profile to network mapping information 1409. Fifth column 1410 identifies device 2 profile to network mapping pairs. Sixth column 1412 identifies device 2 network selection criteria. The combination of the fifth column 1410 and the sixth column 1412 includes device 2 profile to network mapping information 1413. Seventh column 1414 identifies device 3 profile to network mapping pairs. Eighth column 1416 identifies device 3 network selection criteria. The combination of the seventh column 1414 and the eighth column 1416 includes device 3 profile to network mapping information 1417.

Consider, for this example, that device 1 supports communications with network 1 (N1), network 2 (N2) and network 3 (N3); that device 2 supports communications with network 1 (N1), network 2 (N2) and network 3 (N3); and the device 3 supports communications with only network 1 (N1) and network 3 (N3).

Row 1418 indicates that in geographical area 1, sometimes referred to as bubble 1, network N1 and network N2 are available. In geographical area 1, if device 1 uses profile D1P1 (device 1 profile 1), then device 1 uses network N1; however, if device 1 uses profile D1P2 (device 1 profile 2), then device 1 uses network N2. Device 1 selects between network N1 and network N2 based on criteria 1A, and current information and/or current conditions. In geographical area 1, if device 2 uses profile D2P1 (device 2 profile 1), then device 2 uses network N1; however, if device 2 uses profile D2P2 (device 2 profile 2), then device 2 uses network N2. Device 2 selects between network N1 and network N2 based on criteria 2A, and current information and/or current conditions. In geographical area 1, if device 3 uses profile D3P1 (device 3 profile 1), then device 3 uses network N1. Criteria 3A indicates that device 3 is to use network N1.

Row 1420 indicates that in geographical area 2, sometimes referred to as bubble 2, network N1 and network N3 are available. In geographical area 2, if device 1 uses profile D1P1 (device 1 profile 1), then device 1 uses network N1; however, if device 1 uses profile D1P3 (device 1 profile 3), then device 1 uses network N3. Device 1 selects between network N1 and network N3 based on criteria 1B, and current information and/or current conditions. In geographical area 2, if device 2 uses profile D2P1 (device 2 profile 1), then device 2 uses network N1; however, if device 2 uses profile D2P3 (device 2 profile 3), then device 2 uses network N3. Device 2 selects between network N1 and network N3 based on criteria 2B, and current information and/or current conditions. In geographical area 2, if device 3 uses profile D3P1 (device 3 profile 1), then device 3 uses network N1. Criteria 3B indicates that device 3 is to use network N1.

Row 1422 indicates that in geographical area 3, sometimes referred to as bubble 3, only network N2 is available. In geographical area 3, if device 1 uses profile D1P2 (device 1 profile 2), then device 1 uses network N2. Criteria 1C indicates that device 1 is to use network N2. In geographical area 3, if device 2 uses profile D2P2 (device 2 profile 2), then device 2 uses network N2. Criteria 2C indicates that device 3 is to use network N2. In geographical area 3, device 3 is unable to communicate with any of the available networks.

Row 1424 indicates that in geographical area 4, sometimes referred to as bubble 4, only network N3 is available. In geographical area 4, if device 1 uses profile D1P3 (device 1 profile 3), then device 1 uses network N3. Criteria 1D indicates that device 1 is to use network N3. In geographical area 4, if device 2 uses profile D2P3 (device 2 profile 3), then device 2 uses network N3. Criteria 2D indicates that device 2 is to use network N3. In geographical area 3, if device 3 uses profile D3P2 (device 3 profile 2) then device 3 uses network N3. Criteria 3C indicates that device 3 is to use network N3.

Various examples of criteria, in which selection is between multiple, e.g. two, alternative networks will now be described, e.g. corresponding to any of criteria 1A, criteria 2A, criteria 3A, criteria 1B, or criteria 2B.

In one example, the control device selects a particular network for each UE to use in each geographic region in which there are alternatives available. For example, criteria 1A=information indicating use network N1; criteria 2A=information indicating use network N2; criteria 3A=information indicating use network N1; criteria 1B=information indicating use network N3; and criteria 2B=information indicating use network N1.

In some such embodiments, the control device selection criteria information changes over time, e.g., to perform networks' load balancing. In some embodiments, at a particular time two UE devices in the same geographic area with the same or substantially same characteristics and/or resource needs (from the perspective of the control device) may be, and sometimes are, commanded by the control device to use different networks for access, e.g., to achieve overall load balancing.

In some embodiments, the control device may, and sometimes does, send in selection criteria information indicating or including: a set of rules, conditions, identified parameters, variables or types of information (e.g., day information (day of week), time information (time ranges), received signal strength, QoS, latency, battery power level, amount of amount to be transmitted, SNR, interference level, applications, etc.), and/or other information such as thresholds, to be used by the UE in making a selection of which network to use in a particular geographic area.

For example, in some embodiments, the criteria includes a time consideration, e.g., criteria 1A=use network N2 during a first time interval and use network N1 during other times, criteria 2A=use network N2 during a second time interval and use network N1 during other time intervals.

In another example, the criteria includes a battery power level consideration. For example, criteria 1A=use network N2 when battery power is above a first threshold and use network N1 during when battery power is greater than or equal to a said first threshold, criteria 2A=use network N2 when battery power is above a second threshold and use network N1 when battery power is greater than or equal to said second threshold.

In another example, the criteria includes an application in use consideration. For example, criteria 1A=use network N2 when an application in a first predetermined set of applications is active and use network N1 otherwise, criteria 2A=use network N2 when an application in a second predetermined set of applications is active and use network N1 otherwise.

Other exemplary criteria include considerations for amount of data to transmit, strength of received signals from the alternative access devices, measured interference levels, measured noise, measured SNR, latency requirements, and/or quality of service (QoS) requirements.

In various embodiments, a network device selection criteria for a particular device for a particular geographic area includes a plurality of different considerations in combination, e.g. time, received signal strength, SNR, battery power level, latency requirements, and QoS requirements. In various embodiments, the control device also factors in network loading considerations, e.g. on networks and/or particular access devices.

In some embodiments, a set of selection criteria (e.g., criteria 1A, criteria 1B, criteria 1C, criteria 1D)), corresponding to a particular UE device (e.g., device 1) and geographic location (e.g., geography area 1) combination may be, and sometimes is, updated by the control device and communicated to the UE device, without changing selection criteria corresponding to other UE devices.

In some embodiments, an individual selection criteria (e.g., criteria 1A), corresponding to a particular UE device (e.g., device 1) and geographic location (e.g., geography area 1) combination may be, and sometimes is, updated by the control device and communicated to the UE device, without changing other selection criteria.

Figure 16A:
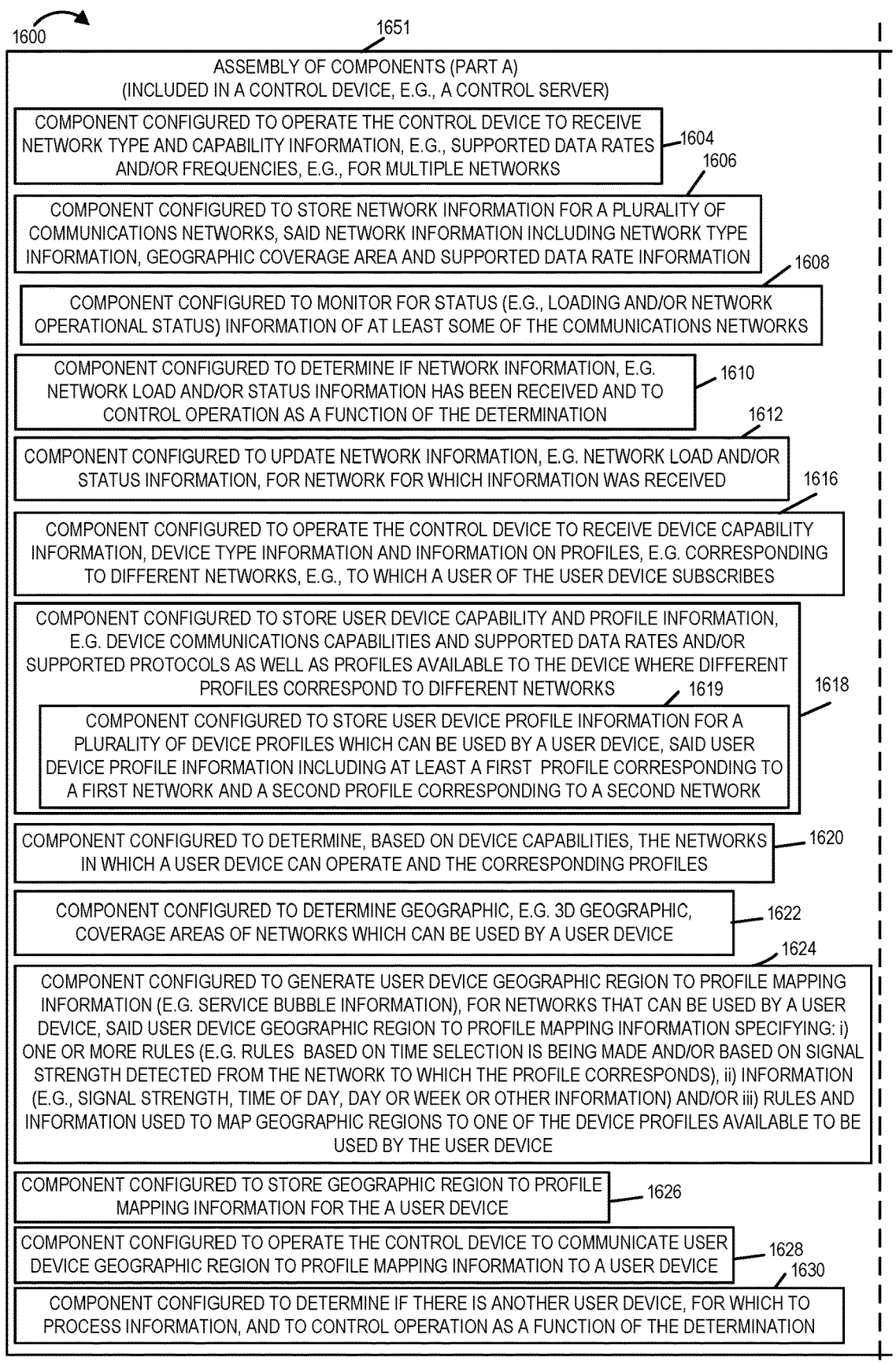
FIG. 16A is first part of drawing of an exemplary assembly of components which may be included in a control device in accordance with an exemplary embodiment.
Figure 16B:
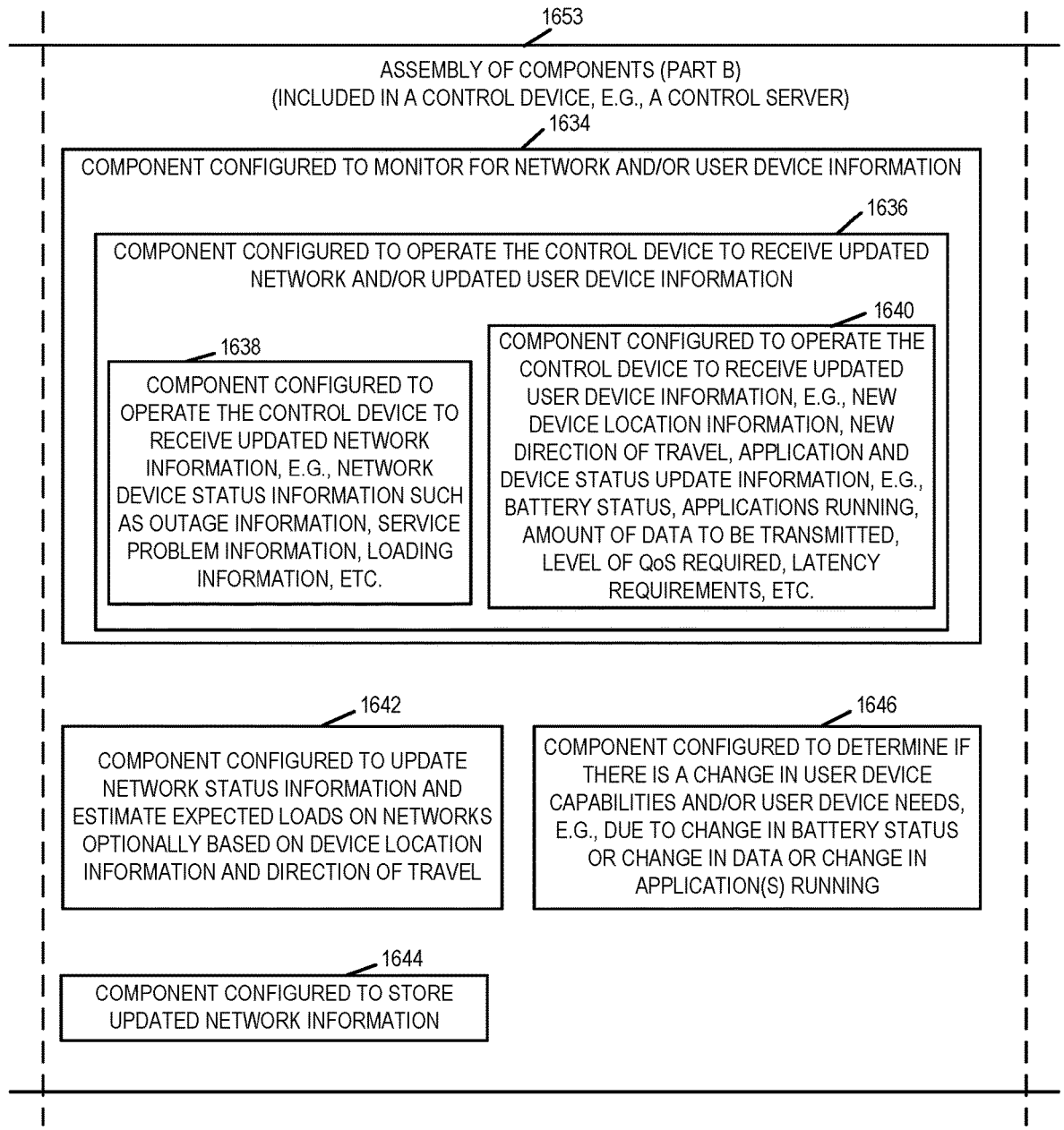
FIG. 16B is second part of drawing of an exemplary assembly of components which may be included in a control device in accordance with an exemplary embodiment.
Figures 16, 16C:
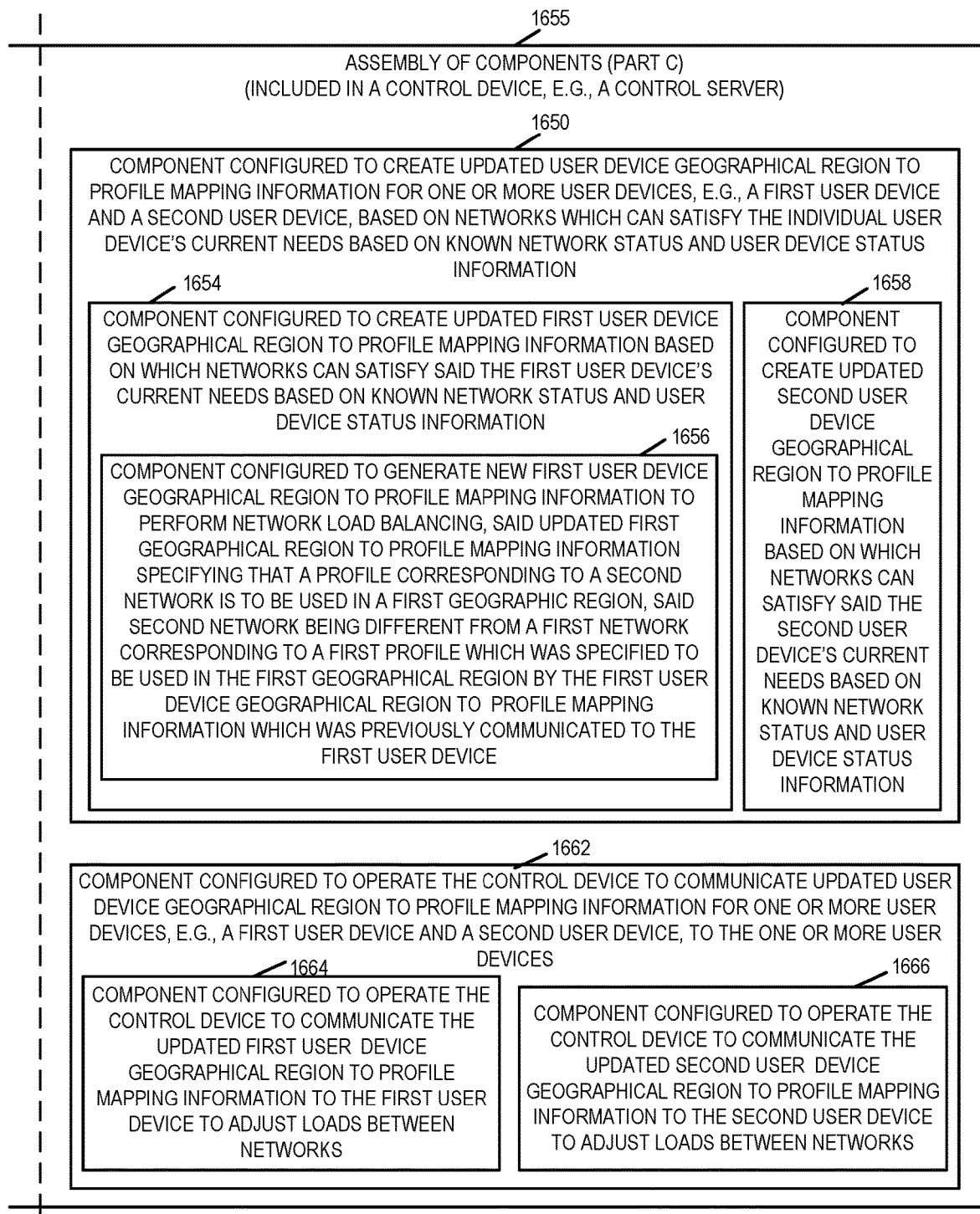
FIG. 16C is third part of drawing of an exemplary assembly of components which may be included in a control device in accordance with an exemplary embodiment.
FIG. 16 comprises the combination of FIG. 16A, FIG. 16B and FIG. 16C/

FIG. 16, comprising the combination of FIG. 16A, FIG. 16B and FIG. 16C, is drawing of an exemplary assembly of components 1600, comprising Part A 1601, Part B 1603 and Part C 1605, which may be, and sometimes is, included in a control device, e.g., a control server, in accordance with an exemplary embodiment. Assembly of components 1600 is, e.g., included in any of control device 1502 of FIG. 1, a server implementing the method of flowchart 100 of FIG. 2, a server implementing the method of flowchart 500 of FIG. 6, control device 1000 of FIG. 11, a control device implementing the method of flowchart 1100 of FIG. 12, control server 1301 of FIG. 14, and/or a control device or server described with respect to any of the Figures.

The components in the assembly of components 1600 can, and in some embodiments are, implemented fully in hardware within a processor, e.g., processor 1002, e.g., as individual circuits. The components in the assembly of components 1600 can, and in some embodiments are, implemented fully in hardware within the assembly of hardware components 1010, e.g., as individual circuits corresponding to the different components. In other embodiments some of the components are implemented, e.g., as circuits, within processor 1002 with other components being implemented, e.g., as circuits within assembly of components 1010, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1012 of the control device 1000, with the components controlling operation of control device 1000 to implement the functions corresponding to the components when the components are executed by a processor e.g., processor 1002. In some such embodiments, the assembly of components 1600 is included in the memory 1012 as part of an assembly of software components 1022. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 1002, configure the processor to implement the function corresponding to the component. In embodiments where the assembly of components 1600 is stored in the memory 1012, the memory 1012 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the control device 1000 or elements therein such as the processor 1002, to perform the functions of corresponding steps illustrated and/or described in the method of one or more of the flowcharts, signaling diagrams and/or described with respect to any of the Figures. Thus, the assembly of components 1600 includes various components that perform functions of corresponding one or more described and/or illustrated steps of an exemplary method, e.g., steps of the method of flowchart 1100 of FIG. 12.

Assembly of components 1600 in includes a component 1604 configured to operate the control device to receive network type and capability information, e.g., supported data rates and frequencies, for multiple networks, a component 1606 configured to store network information for a plurality of communications networks, said network information including network type information, geographic coverage area and supported data rate information, a component 1608 configured to monitor for status, e.g. loading and/or operational status, information of at least some of the communications networks, a component 1610 configured to determine if network information, e.g., network load and/or status information, has been received and to control operation as a function of the determination, and a component 1612 configured to update network information, e.g., network load and/or network status information, for a network for which information was received.

Assembly of components 1600 further includes a component 1616 configured to operate the control device to receive device capability information, device type information, and information on profiles, e.g., corresponding to different networks, e.g., to which a user of a user device subscribes, a component 1618 configured to store user device capability and profile information, e.g., device communications capabilities and supported data rates and/or supported protocols as well as profiles available to the device where different profiles correspond to different networks. Component 1618 includes a component 1619 configured to store user device profile information for a plurality of device profiles which can be used by a user device, said user device profile information including at least a first profile corresponding to a first network and a second profile corresponding to a second network. Assembly of components 1600 further includes a component 1620 configured to determine, based on device capabilities, the networks in which a user device can operate and the corresponding profiles, a component 1622 configured to determine a geographic, e.g., 3-dimension (3D) geographic, coverage areas which can be used by a user device, and a component 1124 configured to generate user device geographic region to profile mapping information (e.g., service bubble information), for networks that can be used by a user device, said user device geographic region to profile mapping information specifying: i) one or more rules (e.g. rules based on time selection is being made, and/or signal strength detect from the network to which the profile corresponds); ii) information (e.g., signal strength, time of day or week or other information) and/or iii) rules and information used to map geographic regions to one of the device profiles available to be used by the user device, a component 1126 configured to store geographic region to profile mapping information for a user device, a component 1128 configured to operate the control device to communicate user device geographic region to profile mapping information to a user device, and a component 1130 configured to determine if there is another user device, for which to process information, and to control operation as a function of the determination.

Assembly of components 1600 further includes a component 1634 configured to monitor for network and/or user device information. Component 1634 includes a component 1636 configured to operate the control device to receive updated network and/or updated user device information. Component 1636 includes a component 1638 configured to operate the control device to receive updated network information, e.g. network device status information such as outage information, service problem information, loading information, etc., and a component 1640 configured to operate the control device to receive updated user device information, e.g. new device location information, new direction of travel, application and device update information, e.g. battery status, application running, amount of data to be transmitted, level of QoS required, latency requirements, etc. Assembly of components 1600 further includes a component 1642 configured to update network status information and estimate expected loads on networks, optionally based on device location information and direction of travel, a component 1644 configured to store updated network information, and a component 1646 configured to determine if there is a change in user device capabilities and/or user device, e.g., due to change in battery status or change in data or change in application(s) running.

Assembly of components 1600 further includes a component 1650 configured to create updated user device geographical region to profile mapping information for one or more user devise, e.g., a first user device and a second user device, based on networks which can satisfy the individual user device's current needs based on known network status and user device status information. Component 1640 includes a component 1654 configured to create updated first user device geographic region to profile mapping information based on which networks can satisfy the first user device's current needs based on known network status and user device status information and a component 1656 configured to create updated second user device geographic region to profile mapping information based on which networks can satisfy the first user device's current needs based on known network status and user device status information. Component 1654 includes a component 1656 configured to generate new first user device geographical region to profile mapping information to perform network load balancing, said updated first geographical region to profile mapping information specifying that a profile corresponding to a second network is to be used in the first geographical region, said second network being different from a first network corresponding to first profile which was specified to be used in the geographical region by the first use device geographical region to profile mapping information which was previously communicated to the first user device.

Assembly of components 1600 further includes a component 1662 configured to operate the control device to communicate updated user device to geographical region to profile mapping information for one or user devices, e.g., a first user device and a second user device, to the one or more user devices. Component 1662 includes a component 1664 configured to operate the control device to communicate the updated first user device geographical region to profile mapping information to the first user device to adjust loads between networks and component 1666 configured to operate the control device to communicate the updated second user device geographical region to profile mapping information to the second user device to adjust loads between networks.

Figure 17:
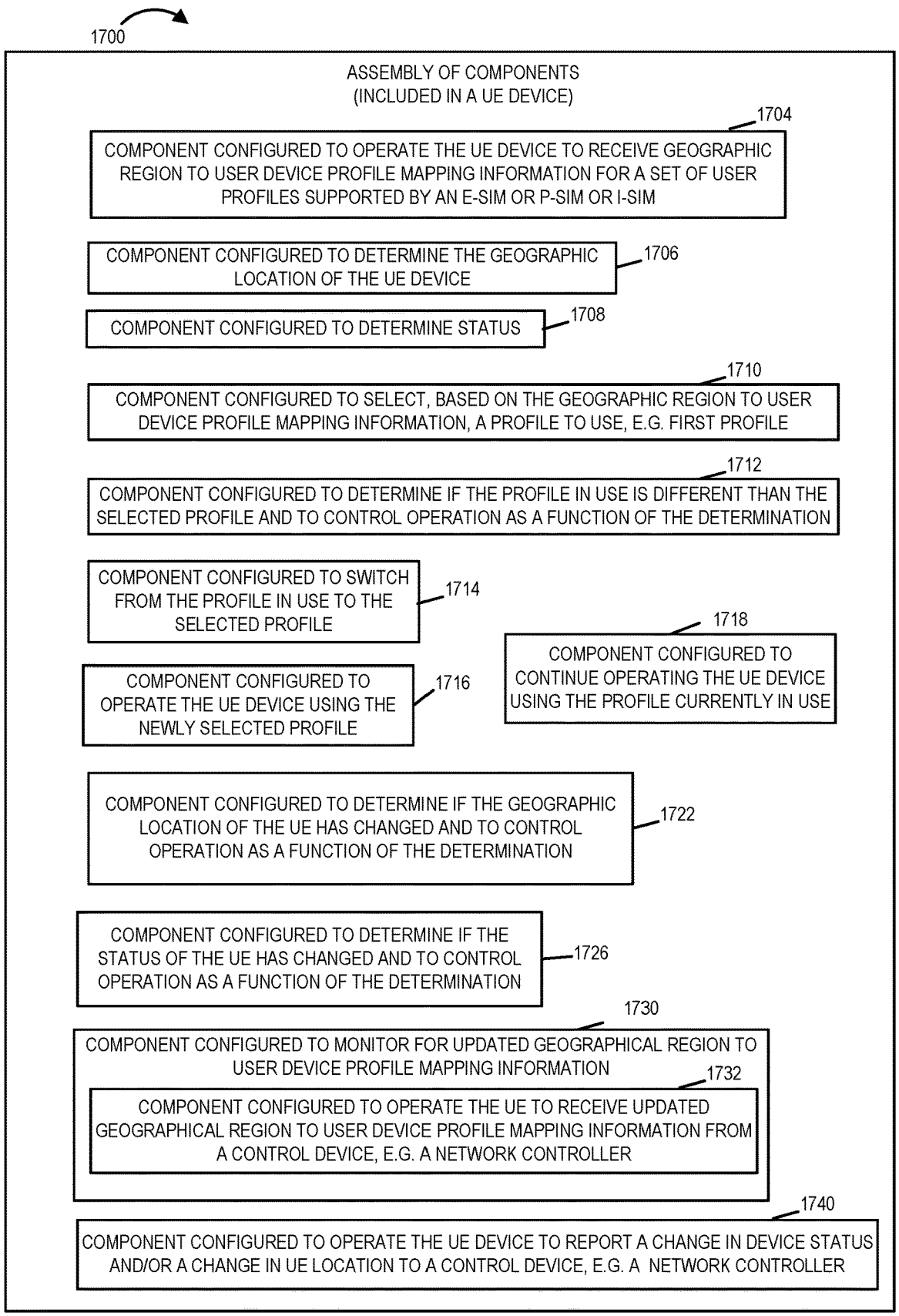
FIG. 17 is a drawing of an exemplary assembly of components which may be included in a user equipment (UE) device in accordance with an exemplary embodiment.

FIG. 17 is a drawing of an exemplary assembly of components 1700 which may be, and sometimes is, included in a user equipment (UE) device in accordance with an exemplary embodiment. Assembly of components 1600 is, e.g. included in any of UEs (UE 1 1540, UE 2 1542, UE 3 1544, UE 4 1546, UE 5 1548, UE 6 1550, UE 7 1552, UE 8 1554, UE 9 1556, UE 10 1558, UE 11 1560, . . . , UE K 1562) of FIG. 1, a UE implementing the method of flowchart 200 of FIG. 3, a UE implementing the method of flowchart 300 of FIG. 4, a UE implementing the method of flowchart 400 of FIG. 5, a UE implementing the method of flowchart 600 of FIG. 7, UE device 900 of FIG. 10, a UE implementing the method of flowchart 1200 of FIG. 13, control server 1301 of FIG. 14, and/or a UE device described with respect to any of the Figures.

The components in the assembly of components 1700 can, and in some embodiments are, implemented fully in hardware within a processor, e.g., processor 902, e.g., as individual circuits. The components in the assembly of components 1700 can, and in some embodiments are, implemented fully in hardware within the assembly of hardware components 910, e.g., as individual circuits corresponding to the different components. In other embodiments some of the components are implemented, e.g., as circuits, within processor 902 with other components being implemented, e.g., as circuits within assembly of components 910, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 912 of the UE device 900, with the components controlling operation of UE device 900 to implement the functions corresponding to the components when the components are executed by a processor e.g., processor 902. In some such embodiments, the assembly of components 1700 is included in the memory 912 as part of an assembly of software components 962. In still other embodiments, various components in assembly of components 1700 are implemented as a combination of hardware and software, e.g., with another circuit external to the processor providing input to the processor which then under software control operates to perform a portion of a component's function.

When implemented in software the components include code, which when executed by a processor, e.g., processor 902, configure the processor to implement the function corresponding to the component. In embodiments where the assembly of components 1700 is stored in the memory 912, the memory 912 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the UE device 900 or elements therein such as the processor 902, to perform the functions of corresponding steps illustrated and/or described in the method of one or more of the flowcharts, signaling diagrams and/or described with respect to any of the Figures. Thus, the assembly of components 1700 includes various components that perform functions of corresponding one or more described and/or illustrated steps of an exemplary method, e.g., steps of the method of flowchart 1200 of FIG. 13.

Assembly of components 1700 includes a component 1704 configured to operate the UE device to receive geographic region to user device profile mapping information for a set of user profiles supported by a p-SIM or e-SIM or i-SIM. For example, a p-SIM, included in the UE device, supports 1 profile in the set of user profiles and an e-EIM or an i-SIM, included in the UE device, supports 2 or more additional profiles, e.g. up to 7 additional user profiles. Assembly of components 1700 further includes a component 1706 configured to determine the geographical location of the UE device, a component 1708 configured to determine status, a component 1710 configured to select, based on the geographical region to user device profile mapping information, a profile to use, e.g. a first profile, a component 1712 configured to determine if the profile currently in use is different than the selected profile and to control operation as a function of the determination, a component 1714 configured to switch from the profile in use to selected profile, e.g. in response to a determination that the profile in use is different than the selected profile, a component 1716 configured to operate the UE device using the newly selected profile, and a component 1718 configured to continue operating the UE device using the profile currently in use, e.g., in response to a determination that the profile currently in use is the same as the selected profile.

Assembly of components 1700 further includes a component 1722 configured to determine if the geographic location of the of the UE has changed, e.g., has the UE moved to a different geographical region, and to control operation as a function of the determination, a component 1726 configured to determine if the status of the UE has changed and to control operation as a function of the determination, and a component 1730 configured to monitor for updated geographic region to user device profile mapping information. In some embodiments, the control device sets a new data flag to indicate that updated geographical region to user device profile mapping information for the UE device if available. Component 1730 includes a component 1732 configured to operate the UE device to receive updated geographical region to user device profile mapping information from a control device, e.g. control server acting as a network controller. Assembly of components 1700 further includes a component 1740 configured to operate the UE device to report a change in device status, e.g. a change in: battery status, application(s) running status, latency requirements, amounts of data to transmitted, QoS requirements, received signal strength measurements, SNR, interference, and/or network subscriptions, etc. and/or a change in location, e.g., UE is now located in a different geographical region or is moving toward a different geographical region, to a control device.

First Numbered List of Exemplary Method Embodiments

Method Embodiment 1. A method of operating a control device (e.g., a control server), the method comprising: storing (1106) network information for a plurality of communications networks said network information including network type (e.g., CDMA, OFDM, WiFi, etc.), geographic coverage area (e.g., with at least some of the communications networks corresponding to different geographic regions) and supported data rate information (e.g., which data rates the network supports) (the network information also includes in some embodiments the frequency range or ranges used by the individual communications networks); monitoring (1104) status (e.g., loading and/or network operational status such as whether the network is suffering from one or more network faults or failures) of at least some of said communications networks; storing (1118) device profile information for at least a first communications device, said first communication device being capable of connecting to a plurality of communications networks, said device profile information including first device profile information including information for a plurality of device profiles which can be used by the first communications device, said first device profile information including at least a first profile corresponding to a first network and a second profile corresponding to a second network; and generating (1124) first device geographic region to profile mapping information (e.g., service bubble information), said first device geographic region to profile mapping information specifying: i) one or more rules (e.g., rules based on time selection is being made and/or based on signal strength detected from the network to which the profile corresponds), ii) information (e.g., signal strength, time of day, day of week or other information) and/or iii) rules and information used to map geographic regions to one of the device profiles available to be used by the first communications device.

Method Embodiment 2. The method of Method Embodiment 1, further comprising: communicating (1128) the first device geographic region to profile mapping information to the first communications device.

Method Embodiment 3. The method of Method Embodiment 2, wherein said the first device geographic regions to profile mapping information indicates one or more three dimensional (3D) spatial regions (e.g., service bubbles) in which the first communications device can or is to use a first profile corresponding to a first network and one or more other 3D spatial regions in which the first communications device can or is to use a second profile corresponding to a second communications network.

Method Embodiment 4. The method of Method Embodiment 3, said the first device geographic regions to profile mapping information indicates both geographic region information indicating geographic regions for which the first profile is to be used and a time (e.g., time of day or day of week) rule specifying particular times the first profile is available for use in the indicated geographic regions.

Method Embodiment 5. The method of Method Embodiment 2, further comprising: receiving (1136) updated network information (e.g., network device status information such as loading or outage information) or updated user device information (e.g., new location information, updated battery status information, amount of data to be transmitted, QoS requirements, latency requirements, etc.)

Method Embodiment 6. The method of Method Embodiment 5, further comprising: creating (1154) updated first device geographic region to profile mapping information based on which networks which can satisfy the user device's current needs based on known network status and user device status information.

Method Embodiment 7. The method of Method Embodiment 6, wherein creating (1154) updated first device geographic region to profile mapping information is based on network loading, said creating updated first device geographic region to profile mapping information including generating (1156) new geographic region to profile mapping information to perform network load balancing, said updated first device geographic region to profile mapping information specifying that a profile corresponding to a second network is to be used in a first geographic region, said second network being different from a first network corresponding to a first profile which was specified to be used in the first geographic region by the first device geographic profile mapping information which was previously communicated to the first communications device.

Method Embodiment 8. The method of Method Embodiment 7, wherein said received updated network information indicated a decrease in loading on the second network or an increase in loading on the first network, said change in loading triggering the change in which profile is selected to be used in the first geographic region when creating the updated first device geographic region to profile mapping information.

Method Embodiment 9. The method of Method Embodiment 8 further comprising: communicating (1164) the updated first device geographic region to profile mapping information to the first communications device to adjust loads between networks.

Method Embodiment 10. The method of Method Embodiment 1, wherein said steps of storing (1106) network information, monitoring status, storing (1108) device profile information and generating (1124) first device geographic region to profile mapping information is performed by a network controller (e.g., a network control device such as a network control server).

Method Embodiment 11. The method of Method Embodiment 1, wherein the first communications device is a user equipment (UE) device including a P-SIM and an E-SIM.

Second Numbered List of Exemplary Method Embodiments

Method Embodiment 1. A method of operating a first user equipment (UE) device, the method comprising: receiving (1204) geographical region to user device profile mapping information for a set of user profiles supported by the first user equipment device, each profile corresponding to a different profile supported by an E-SIM or P-SIM; determining (1206) the geographic location of the first UE device; determining (1208) status; and selecting (1210) based on the geographical region to user device profile mapping information a first profile to use.

Method Embodiment 1A. The method of Method Embodiment 1 wherein the geographical region to user device profile mapping information provides 3D geographic region (e.g., service bubble) to profile mapping information.

Method Embodiment 2. The method of Method Embodiment 1, wherein the geographical regions to user device profile mapping information includes profile selection rules which are based on: geographic location and one or more of: i) an amount of data to be transmitted by the UE device, ii) UE device data latency requirements, and iii) UE device battery status.

Method Embodiment 3. The method of Method Embodiment 2, further comprising: switching (1214) from a profile that is in use to the selected profile when the selected profile in use is different from the selected profile.

Method Embodiment 4. The method of Method Embodiment 3, further comprising: receiving (1232) updated geographical region to user device profile mapping information from the network controller.

Method Embodiment 5. The method of Method Embodiment 4, wherein the received updated geographical region to user device profile mapping information is received after a change in network status (e.g., change in network loading) and includes information indicating a different profile should be used in at least one geographic region than was indicated by previously received user device profile mapping information.

Method Embodiment 6. The method of Method Embodiment 5, further comprising: reporting (1240) a change in device status to a network controller; and wherein the received updated geographical region to user device profile mapping information is based on the reported device status information.

First Numbered List of Exemplary Apparatus Embodiments

Apparatus Embodiment 1. A control device (e.g., a control server) (1000) comprising: a processor (1002) configured to operate the control device (1000) to: store (1106) (e.g., in memory 1012) network information for a plurality of communications networks said network information including network type (e.g., CDMA, OFDM, WiFi, etc.), geographic coverage area (e.g., with at least some of the communications networks corresponding to different geographic regions) and supported data rate information (e.g., which data rates the network supports) (the network information also includes in some embodiments the frequency range or ranges used by the individual communications networks); monitor (1104) status (e.g., loading and/or network operational status such as whether the network is suffering from one or more network faults or failures) of at least some of said communications networks; store (1118) (e.g., in memory 1012) device profile information for at least a first communications device, said first communication device being capable of connecting to a plurality of communications networks, said device profile information including first device profile information including information for a plurality of device profiles which can be used by the first communications device, said first device profile information including at least a first profile corresponding to a first network and a second profile corresponding to a second network; and generate (1124) first device geographic region to profile mapping information (e.g., service bubble information), said first device geographic region to profile mapping information specifying: i) one or more rules (e.g., rules based on time selection is being made and/or based on signal strength detected from the network to which the profile corresponds), ii) information (e.g., signal strength, time of day, day of week or other information) and/or iii) rules and information used to map geographic regions to one of the device profiles available to be used by the first communications device.

Apparatus Embodiment 2. The control device (1000) of Apparatus Embodiment 1, wherein said processor (1002) is further configured to operate the control device (1000) to: communicate (1128) (e.g., via transmitter 1018) the first device geographic region to profile mapping information to the first communications device.

Apparatus Embodiment 3. The control device (1000) of Apparatus Embodiment 2, wherein said the first device geographic regions to profile mapping information indicates one or more three dimensional (3D) spatial regions (e.g., service bubbles) in which the first communications device can or is to use a first profile corresponding to a first network and one or more other 3D spatial regions in which the first communications device can or is to use a second profile corresponding to a second communications network.

Apparatus Embodiment 4. The control device (1000) of Apparatus Embodiment 3, said the first device geographic regions to profile mapping information indicates both geographic region information indicating geographic regions for which the first profile is to be used and a time (e.g., time of day or day of week) rule specifying particular times the first profile is available for use in the indicated geographic regions.

Apparatus Embodiment 5. The control device (1000) of Apparatus Embodiment 2, wherein said processor (1002) is further configured to operate the control device (1002) to: receive (1136) (e.g., via receiver 1016) updated network information (e.g., network device status information such as loading or outage information) or updated user device information (e.g., new location information, updated battery status information, amount of data to be transmitted, QoS requirements, latency requirements, etc.).

Apparatus Embodiment 6. The control device (1000) of Apparatus Embodiment 5, wherein said processor (1002) is further configured to: create (1154) updated first device geographic region to profile mapping information based on which networks which can satisfy the user device's current needs based on known network status and user device status information.

Apparatus Embodiment 7. The control device (1002) of Apparatus Embodiment 6, wherein creating (1154) updated first device geographic region to profile mapping information is based on network loading, said creating updated first device geographic region to profile mapping information including generating (1156) new geographic region to profile mapping information to perform network load balancing, said updated first device geographic region to profile mapping information specifying that a profile corresponding to a second network is to be used in a first geographic region, said second network being different from a first network corresponding to a first profile which was specified to be used in the first geographic region by the first device geographic profile mapping information which was previously communicated to the first communications device.

Apparatus Embodiment 8. The control device (1000) of Apparatus Embodiment 7, wherein said received updated network information indicated a decrease in loading on the second network or an increase in loading on the first network, said change in loading triggering the change in which profile is selected to be used in the first geographic region when creating the updated first device geographic region to profile mapping information.

Apparatus Embodiment 9. The control device (1000) of Apparatus Embodiment 8 wherein said processor (1002) is further configured to operate the control device (1000) to: communicate (1164) (e.g., via TX 1018) the updated first device geographic region to profile mapping information to the first communications device to adjust loads between networks.

Apparatus Embodiment 10. The control device (1000) of Apparatus Embodiment 1, wherein said control device (1000) is network controller (e.g., a network control device such as a network control server).

Apparatus Embodiment 10A. The control device (1000) of Apparatus Embodiment 1, wherein said control device (1000) is a network management node which is part of one of said plurality of networks.

Apparatus Embodiment 10B. The control device (1000) of Apparatus Embodiment 1, wherein said control device performs load management for at least two of said plurality of networks.

Apparatus Embodiment 11. The control device (1000) of Apparatus Embodiment 1, wherein the first communications device (900) is a user equipment (UE) device including a p-SIM and an e-SIM.

Apparatus Embodiment 12. The control device (1000) of Apparatus Embodiment 1, wherein the first communications device (900) is a user equipment (UE) device including a p-SIM and an i-SIM.

Apparatus Embodiment 13. The control device (1000) of Apparatus Embodiment 1, wherein the first communications device (900) is a user equipment (UE) device including one of an i-SIM or e-SIM.

Second Numbered List of Exemplary Apparatus Embodiments

Apparatus Embodiment 1. A first user equipment (UE) device (900) comprising: a processor (902) configured to: operate the UE device to receive (1204) (e.g., via receiver 920 or 932) geographical region to user device profile mapping information for a set of user profiles supported by the first user equipment device, each profile corresponding to a different profile supported by an e-SIM or p-SIM (or i-SIM); determine (1206) the geographic location of the first UE device; determine (1208) status; and select (1210) based on the geographical region to user device profile mapping information a first profile to use.

Apparatus Embodiment 1A. The first UE device (900) of Apparatus Embodiment 1 wherein the geographical region to user device profile mapping information provides 3D geographic region (e.g., service bubble) to profile mapping information.

Apparatus Embodiment 2. The first UE device (900) of Apparatus Embodiment 1, wherein the geographical regions to user device profile mapping information includes profile selection rules which are based on: geographic location and one or more of: i) an amount of data to be transmitted by the UE device, ii) UE device data latency requirements, and iii) UE device battery status.

Apparatus Embodiment 3. The first UE device (900) of Apparatus Embodiment 2, wherein said processor (902) is further configured to: switch (1214) from a profile that is in use to the selected profile when the selected profile in use is different from the selected profile.

Apparatus Embodiment 4. The first UE device (900) of Apparatus Embodiment 3, wherein said processor (902) is further configured to operate the first UE device (900) to: receive (1232) (e.g., via receiver 920 or 932) updated geographical region to user device profile mapping information from the network controller.

Apparatus Embodiment 5. The first UE device (900) of Apparatus Embodiment 4, wherein the received updated geographical region to user device profile mapping information is received after a change in network status (e.g., change in network loading) and includes information indicating a different profile should be used in at least one geographic region than was indicated by previously received user device profile mapping information.

Apparatus Embodiment 6. The first UE device (900) of Apparatus Embodiment 5, wherein said processor (902) is further configured to: operate the first UE device (900) to report (1240) a change in device status to a network controller (e.g. generate and send (via TX 922 or 934) a reporting message reporting the change in device status to the control device); and wherein the received updated geographical region to user device profile mapping information is based on the reported device status information.

Numbered List of Exemplary Non-Transitory Computer Readable Medium Embodiments

Non-Transitory Computer Readable Medium Embodiment 1. A non-transitory computer readable medium (1012) including machine executable instructions which when executed by a processor (1002) of a control device (1000) (e.g., a control server) control the control device (1000) to perform the steps of: storing (1106) network information for a plurality of communications networks said network information including network type (e.g., CDMA, OFDM, WiFi, etc.), geographic coverage area (e.g., with at least some of the communications networks corresponding to different geographic regions) and supported data rate information (e.g., which data rates the network supports) (the network information also includes in some embodiments the frequency range or ranges used by the individual communications networks); monitoring (1104) status (e.g., loading and/or network operational status such as whether the network is suffering from one or more network faults or failures) of at least some of said communications networks; storing (1118) device profile information for at least a first communications device, said first communication device being capable of connecting to a plurality of communications networks, said device profile information including first device profile information including information for a plurality of device profiles which can be used by the first communications device, said first device profile information including at least a first profile corresponding to a first network and a second profile corresponding to a second network; and generating (1124) first device geographic region to profile mapping information (e.g., service bubble information), said first device geographic region to profile mapping information specifying: i) one or more rules (e.g., rules based on time selection is being made and/or based on signal strength detected from the network to which the profile corresponds), ii) information (e.g., signal strength, time of day, day of week or other information) and/or iii) rules and information used to map geographic regions to one of the device profiles available to be used by the first communications device Non-Transitory Computer Readable Medium Embodiment 2. A non-transitory computer readable medium (912) including machine executable instructions which when executed by a processor (902) of a user equipment (UE) device (900) control the UE device (900) to perform the steps of: receiving (1204) geographical region to user device profile mapping information for a set of user profiles supported by the first user equipment device, each profile corresponding to a different profile supported by an E-SIM or P-SIM; determining (1206) the geographic location of the first UE device; determining (1208) status; and selecting (1210) based on the geographical region to user device profile mapping information a first profile to use.

In various embodiments an embedded device such as an embedded-SIM (eSIM) or embedded universal integrated circuit card (eUICC) is used. In such cases the embedded device can be in the form of programmable SIM card that is embedded directly into a device. In machine-to-machine (M2M) applications, where there is no requirement to change the SIM card, this avoids the requirement for a connector. This improves reliability, network security and security, while also reducing space requirements, since a relatively bulky connector is no longer needed, increasing design flexibility. An eSIM can be provisioned remotely; end-users can add or remove operators without the need to physically swap a SIM from the device. eSIM is a global specification by the GSMA which enables remote SIM provisioning of any mobile device. GSMA defines eSIM as the SIM for the next generation of connected consumer device. Networking solutions using eSIM technology can be widely applicable to various Internet of Things (IoT) scenarios, including connected cars (smart rearview mirrors, on-board diagnostics (OBD), vehicle Wi-Fi hotspots), as well as artificial intelligence translators, MiFi devices, smart earphones, smart metering, GPS tracking units, DTU, bike-sharing, advertising players, video surveillance devices, etc.

Various embodiments are directed to apparatus, e.g., control devices such as control servers, management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating control devices, e.g. control servers, management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware. Many of the above-described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a control device such as a control server, a management node, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., control devices such as control servers, management nodes, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a control device such as a control server, a management node, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a control device such a control server, a management node, a communications node such as e.g., an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a control device such as a control server, a management node, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first user equipment (UE) device, the method comprising:
   receiving geographical region to user device profile mapping information for a first geographic area, said geographic region to user device profile mapping information for the first geographic area including network selection criteria controlling selection between a first network and a second network based on first UE device battery status and a battery power threshold;
   monitoring, at the first UE device, for updated geographical region to user device profile mapping information;
   determining UE device status, said UE device status including UE device battery status;
   receiving updated geographical region to user device profile mapping information for the first geographic area from a control device, said updated geographical region to user device profile mapping information being different from said first received geographical region to user device profile mapping information and including updated network selection criteria controlling selection between the first network and the second network based on the UE device battery status; and
   selecting at the first UE, based on the UE device battery status and the updated geographical region to user device profile mapping information, a network to use, said selecting being between the first network and the second network.

2. The method of claim 1 wherein updated network selection criteria controlling selection between the first network and the second network based on the UE device battery status was updated by the control device based on network status.

3. The method of claim 1, wherein the geographical region to user device profile mapping information includes profile selection rules which are based on both geographic location and UE device battery status.

4. The method of claim 3, further comprising:
   making a profile selection based on at least the geographic region in which the user first user device is located, each profile from which the profile selection is made corresponding to a different network; and
   switching from a profile that is in use to the selected profile when the profile in use is different from the selected profile.

5. The method of claim 3, wherein monitoring, at the first UE device, for updated geographical region to user device profile mapping information includes monitoring for a change in a service configuration change flag at the control device.

6. The method of claim 5, wherein the received updated geographical region to user device profile mapping information is received after a change in network status and includes information indicating a different profile should be used in at least one geographic region than was indicated by previously received user device profile mapping information.

7. The method of claim 1, wherein the user device profile mapping information includes profile selection rules based on UE device battery status.

8. A first user equipment (UE) device comprising:
   a processor configured to operate the first UE device to:
      receive geographical region to user device profile mapping information for a first geographic area, said geographic region to user device profile mapping information for the first geographic area including network selection criteria controlling selection between a first network and a second network based on first UE device battery status and a battery power threshold;

monitor, at the first UE device for updated geographical region to user device profile mapping information;

determine UE device status, said UE device status including UE device battery status;

receive updated geographical region to user device profile mapping information for the first geographic area from a control device, said updated geographical region to user device profile mapping information being different from said first received geographical region to user device profile mapping information and including updated network selection criteria controlling selection between the first network and the second network based on the first UE device battery status; and select, based on the UE device battery status and the updated geographical region to user device profile mapping information, a network to use, said selecting including a selection between the first network and the second network.

9. The first UE device of claim 8, wherein updated network selection criteria controlling selection between the first network and the second network based on said UE device battery status was updated by the control device based on network status.

10. The first UE device of claim 8, wherein the geographical region to user device profile mapping information includes profile selection rules which are based on both geographic location and UE device battery status.

11. The first UE device of claim 10, wherein said processor is further configured to:

make a profile selection based on at least the geographic region in which the user first user device is located, each profile from which the profile selection is made corresponding to a different network; and switch from a profile that is in use to the selected profile when the selected profile is different from the selected profile.

12. The first UE device of claim 10, wherein the processor is configured to control the first UE device, as part of being configured to control the first UE device to monitor for updated geographical region to user device profile mapping information to control the first UE device to:

monitor for a change in a service configuration change flag at the control device.

13. The first UE device of claim 12, wherein the received updated geographical region to user device profile mapping information is received after a change in network status and includes information indicating a different profile should be used in at least one geographic region than was indicated by previously received user device profile mapping information.

14. The first UE device of claim 8, wherein the user device profile mapping information includes profile selection rules based on UE device battery status.

15. A non-transitory computer readable medium including machine executable instructions which when executed by a processor of a user equipment (UE) device control the UE device to perform the steps of:

receiving geographical region to user device profile mapping information for a first geographic area, said geographic region to user device profile mapping information for the first geographic area including network selection criteria controlling selection between a first network and a second network based on first UE device battery status and a battery power threshold;

monitoring, at the first UE device, for updated geographical region to user device profile mapping information;

determining UE device status, said UE device status including UE device battery status;

receiving updated geographical region to user device profile mapping information for the first geographic area from a control device, said updated geographical region to user device profile mapping information being different from said received geographical region to user device profile mapping information and including updated network selection criteria controlling selection between the first network and the second network based on the UE device battery status; and selecting at the first UE, based on the UE device battery status and the updated geographical region to user device profile mapping information, a network to use, said selecting being between the first network and the second network.

* * * * *